US011079037B2

(12) United States Patent
Kunau

(10) Patent No.: US 11,079,037 B2
(45) Date of Patent: *Aug. 3, 2021

(54) RAPID OPENING GAS VALVE

(71) Applicant: Gaither Tool Company, Inc., Jacksonville, IL (US)

(72) Inventor: Daniel Kunau, Boone, CO (US)

(73) Assignee: Gaither Tool Company, Incorporated, Jacksonville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,579

(22) Filed: Apr. 23, 2019

(65) Prior Publication Data

US 2019/0249794 A1    Aug. 15, 2019

Related U.S. Application Data

(63) Continuation-in-part of application No. 15/820,378, filed on Nov. 21, 2017, now Pat. No. 10,266,019.

(51) Int. Cl.
*F16K 31/143* (2006.01)
*F16K 1/30* (2006.01)
(Continued)

(52) U.S. Cl.
CPC .......... *F16K 31/143* (2013.01); *B60C 25/145* (2013.01); *B60C 29/068* (2013.01);
(Continued)

(58) Field of Classification Search
CPC ... B60C 29/064; B60C 29/068; B60C 25/138; B60C 25/145; F16K 1/126; F16K 1/302;
(Continued)

(56) References Cited

U.S. PATENT DOCUMENTS 1,459,775 A * 6/1923 Larner ................. G05D 16/106
137/207
1,516,483 A ‡ 11/1924 Krafft ...................... F41A 9/23
124/69
(Continued)

FOREIGN PATENT DOCUMENTS

EP        408921 A1 ‡ 1/1991

OTHER PUBLICATIONS

Principle of the Axial Valve, unknown publication date, downloaded from http://www.duncanrogers.com/literature/axialvalve.pdf on about Jan. 25, 2011.‡

(Continued)

*Primary Examiner* — William M McCalister
(74) *Attorney, Agent, or Firm* — Qpatents

(57) ABSTRACT

A pneumatically operated gas valve mounted on a vessel containing pressurized gas. The gas valve includes a piston positioned in a cylinder with one closed end so that the piston seats against a gas outlet to close the gas valve. A control reservoir is formed in the cylinder between the piston and the closed end of the cylinder. Upon filling vessel, some of the pressurized gas enters the control reservoir to provide a control pressure behind the piston. Actuating the control mechanism vents the control reservoir, resulting in the gas valve opening rapidly to release the pressurized gas in the vessel through an exhaust port of the gas valve.

17 Claims, 11 Drawing Sheets

(51) Int. Cl.
*F16K 31/383* (2006.01)
*B60C 29/06* (2006.01)
*F16K 1/12* (2006.01)
*B60C 25/14* (2006.01)

(52) U.S. Cl.
CPC .............. *F16K 1/126* (2013.01); *F16K 1/302* (2013.01); *F16K 31/383* (2013.01)

(58) Field of Classification Search
CPC . F16K 1/36; F16K 15/20; F16K 24/04; F16K 31/122; F16K 31/1221; F16K 31/143; F16K 31/383; Y10T 137/0318
USPC ........ 251/33, 34, 35, 36, 37, 38, 39, 40, 41, 251/42, 43, 44, 45, 46
See application file for complete search history.

(56) References Cited

U.S. PATENT DOCUMENTS

| | | | | |
|---|---|---|---|---|
| 2,441,186 A | ‡ | 5/1948 | Cooper | B65D 88/72 222/3 |
| 2,495,829 A | ‡ | 1/1950 | Vincent | F41B 11/51 124/50 |
| 2,515,068 A | ‡ | 7/1950 | Young | F16K 13/06 137/68 |
| 2,634,717 A | ‡ | 4/1953 | Junkin | F41B 11/52 124/50 |
| 2,841,359 A | * | 7/1958 | Berck | F16K 3/246 251/25 |
| 2,919,714 A | ‡ | 1/1960 | Mrazek | F16K 1/126 137/22 |
| 2,972,998 A | ‡ | 2/1961 | Detwiler | F16K 13/06 137/68 |
| 3,008,683 A | * | 11/1961 | Filliung | E03D 5/10 251/30.03 |
| 3,101,733 A | ‡ | 8/1963 | Lord | F16K 13/06 137/68 |
| 3,297,047 A | ‡ | 1/1967 | Sime | F16K 1/126 137/22 |
| 3,380,469 A | ‡ | 4/1968 | Salerno | B64D 13/02 137/21 |
| 3,399,689 A | * | 9/1968 | Keane | F16K 1/126 137/220 |
| 3,415,269 A | * | 12/1968 | Salerno | F16K 31/42 137/219 |
| 3,528,474 A | * | 9/1970 | May | B60C 25/145 157/1.1 |
| 3,566,907 A | * | 3/1971 | Sime | F16K 1/126 137/219 |
| 3,580,274 A | ‡ | 5/1971 | Hansen | A62C 13/003 137/49 |
| 3,680,540 A | ‡ | 8/1972 | Stengl | F41B 11/62 124/50 |
| 3,742,968 A | ‡ | 7/1973 | Kennedy | F16K 17/14 137/68 |
| 3,788,400 A | * | 1/1974 | Tufts | A62C 35/645 169/11 |
| 3,788,527 A | ‡ | 1/1974 | Matson | B65D 88/703 222/19 |
| 3,866,654 A | ‡ | 2/1975 | Duquesne | B60C 25/145 137/22 |
| 3,913,604 A | ‡ | 10/1975 | Hanson | B01J 7/00 137/68 |
| 3,915,339 A | ‡ | 10/1975 | Matson | B65D 88/703 124/55 |
| 3,971,412 A | ‡ | 7/1976 | Wierzbicki | F16K 31/143 137/62 |
| 3,977,423 A | ‡ | 8/1976 | Clayton | G05D 16/166 137/12 |
| 4,026,327 A | * | 5/1977 | Deinlein-Kalb | F01D 17/145 137/630 |
| 4,044,651 A | * | 8/1977 | Warrick | F15B 9/06 91/47 |
| 4,046,163 A | * | 9/1977 | Novak | B60C 29/06 137/512.3 |
| 4,234,009 A | ‡ | 11/1980 | Fuchs | F16K 1/126 137/21 |
| 4,285,495 A | ‡ | 8/1981 | King | F16K 1/126 137/21 |
| 4,477,051 A | * | 10/1984 | Ben-Yehuda | F16K 31/402 251/298 |
| 4,589,496 A | ‡ | 5/1986 | Rozniecki | A62C 35/02 137/68 |
| 4,593,715 A | * | 6/1986 | Stich | F16K 31/383 137/110 |
| 4,615,356 A | ‡ | 10/1986 | Reip | F16K 17/105 137/48 |
| 4,676,402 A | ‡ | 6/1987 | Stetson | B67D 7/72 222/19 |
| 4,732,189 A | * | 3/1988 | Jones | F16K 31/1223 137/220 |
| 4,767,024 A | ‡ | 8/1988 | Rappen | B65D 88/703 222/19 |
| 4,817,821 A | ‡ | 4/1989 | Simoens | B65D 88/703 222/19 |
| 5,000,516 A | * | 3/1991 | Kolle | E21C 37/12 102/329 |
| 5,042,547 A | ‡ | 8/1991 | Van De Sype | B60C 25/145 157/1 |
| 5,072,764 A | ‡ | 12/1991 | Ochoa | B60C 25/145 157/1 |
| 5,143,256 A | ‡ | 9/1992 | Wadensten | B65D 88/703 222/19 |
| 5,168,911 A | ‡ | 12/1992 | Gottschalk | B60C 25/145 141/95 |
| 5,431,181 A | * | 7/1995 | Saadi | E03D 3/06 137/15.11 |
| 5,456,302 A | * | 10/1995 | Demers | B60C 25/145 157/1 |
| 5,487,527 A | * | 1/1996 | Eggleston | F16K 31/1228 251/62 |
| 5,623,990 A | * | 4/1997 | Pirkle | F24D 1/005 165/294 |
| 5,842,501 A | * | 12/1998 | Powell | F16K 17/105 137/489 |
| 5,853,160 A | ‡ | 12/1998 | Hurdis | B65D 88/703 251/30 |
| 5,884,659 A | * | 3/1999 | Prosser | B60C 25/145 137/223 |
| 5,924,444 A | * | 7/1999 | Fendel | B60C 23/0496 137/226 |
| 6,161,570 A | * | 12/2000 | McNeely | G05D 16/166 137/491 |
| 6,179,033 B1 | * | 1/2001 | Demers | B60C 25/132 |
| 6,318,406 B1 | ‡ | 11/2001 | Conley | F16K 17/10 137/49 |
| 6,439,891 B1 | * | 8/2002 | Tate | F16K 1/123 434/11 |
| 6,536,533 B2 | ‡ | 3/2003 | Reilly | A62C 37/46 169/16 |
| 6,601,780 B1 | ‡ | 8/2003 | Sheng | F41B 11/52 239/33 |
| 6,708,771 B2 | ‡ | 3/2004 | Reilly | A62C 35/62 169/16 |
| 6,708,772 B2 | ‡ | 3/2004 | Bermes | A62C 35/68 169/19 |
| 6,726,059 B2 | ‡ | 4/2004 | Treat | B65D 88/703 137/49 |
| 6,925,997 B2 | ‡ | 8/2005 | Sheng | F41B 11/52 124/56 |
| 6,981,842 B2 | * | 1/2006 | D'Angelo | F01D 17/105 415/144 |
| 7,395,749 B2 | * | 7/2008 | Adams | F15B 15/227 91/395 |
| 7,527,049 B2 | ‡ | 5/2009 | Sheng | F41B 11/721 124/73 |
| 7,866,308 B2 | ‡ | 1/2011 | Jones | F41B 11/73 124/56 |

(56) References Cited

U.S. PATENT DOCUMENTS

| | | | | |
|---|---|---|---|---|
| 8,261,728 B1 ‡ | 9/2012 | Tseng | F41B 11/55 | 124/73 |
| 8,561,711 B2 ‡ | 10/2013 | Karalis | F16K 31/382 | 169/46 |
| 10,266,019 B2 * | 4/2019 | Kunau | B60C 25/138 | |
| 2002/0134365 A1 ‡ | 9/2002 | Gray | F41H 13/0006 | 124/56 |
| 2003/0005918 A1 ‡ | 1/2003 | Jones | F41B 11/57 | 124/70 |
| 2003/0178151 A1 ‡ | 9/2003 | Ritchie | B60C 25/145 | 157/1 |
| 2005/0183711 A1 ‡ | 8/2005 | Eichner | F41B 11/00 | 124/73 |
| 2005/0188977 A1 ‡ | 9/2005 | Wygant | A63B 69/409 | 124/73 |
| 2006/0169265 A1 ‡ | 8/2006 | Lai | F41B 11/62 | 124/71 |
| 2007/0028909 A1 ‡ | 2/2007 | Wood | F41B 11/724 | 124/73 |
| 2008/0011283 A1 ‡ | 1/2008 | Lai | F41B 11/721 | 124/73 |
| 2009/0178660 A1 ‡ | 7/2009 | Huang | F41B 11/721 | 124/73 |
| 2010/0199961 A1 ‡ | 8/2010 | Liao | F41B 11/721 | 124/73 |
| 2011/0120437 A1 ‡ | 5/2011 | Tippmann, Jr. | F41B 11/55 | 124/74 |
| 2011/0132464 A1 * | 6/2011 | Ferlin | B60C 29/06 | 137/1 |
| 2011/0252895 A1 * | 10/2011 | Kiesbauer | F15B 19/005 | 73/862.583 |
| 2011/0253318 A1 * | 10/2011 | Kunau | B60C 25/145 | 157/1.17 |
| 2012/0192707 A1 ‡ | 8/2012 | Rogers | F41H 11/02 | 89/36 |
| 2012/0192847 A1 ‡ | 8/2012 | Hague | F41B 11/721 | 124/77 |
| 2012/0234499 A1 * | 9/2012 | Kunau | B60C 25/145 | 157/1.1 |
| 2012/0318251 A1 ‡ | 12/2012 | Tseng | F41B 11/721 | 124/73 |
| 2013/0008530 A1 * | 1/2013 | Ishitoya | F16K 31/1221 | 137/505 |
| 2013/0104868 A1 ‡ | 5/2013 | Sikes | F41B 11/723 | 124/77 |
| 2013/0239937 A1 ‡ | 9/2013 | Macri | B63C 9/22 | 124/56 |

OTHER PUBLICATIONS

He DANFLO Family of Control Valves, Nov. 2009, downloaded from http://www.mandjvalve.com/literature/MJ-1690_DANFLOfamily_mj.pdf on about Jan. 25, 2011.‡

Pneumatically Operated Deluge Valve model 116FC, Mar. 16, 1999, downloaded from http://www.controlvalves.com/valveFiles/sWJNy-DGVpx-KNIGW-116FC_OM_with_sizes.PDF on about Jan. 25, 2011.‡

Unknown Author; "The Bead Seater" sales brochure; marketing info published by Astra Mfg. Inc., Manchester, N.H.; 2001.‡

\* cited by examiner
‡ imported from a related application

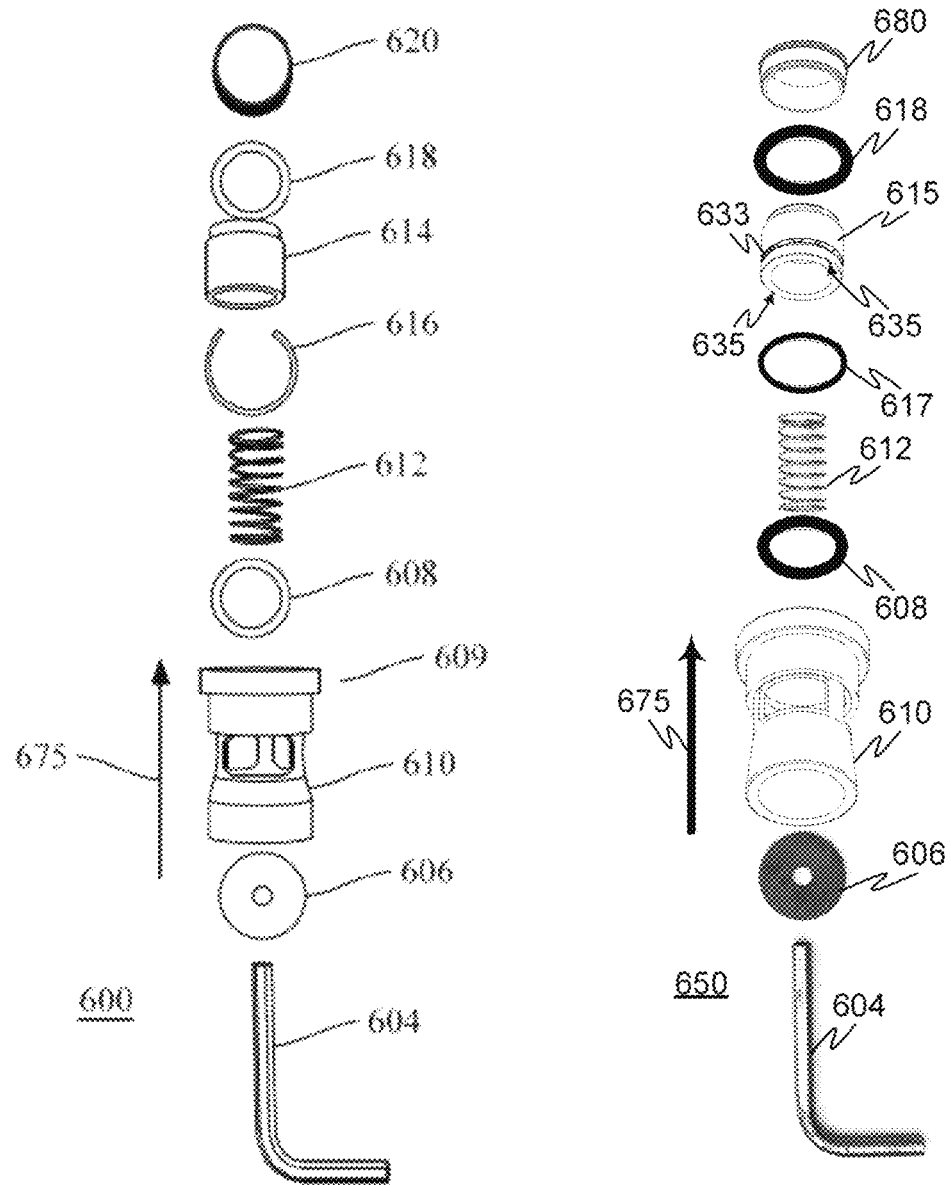

RAPID OPENING GAS VALVE

CROSS-REFERENCE TO RELATED APPLICATIONS

The present application claims priority from, and incorporates by reference in its entirety, pending U.S. patent application Ser. No. 15/820,378 filed Nov. 21, 2017.

BACKGROUND

Technical Field

The present subject matter relates to valves. More specifically, the present subject matter relates to a pneumatically controlled, rapid-opening, gas valve.

Description of Related Art

Many types of valves suitable for controlling a flow of a gas are known in the art. Common types of gas valves mechanisms include ball valves, butterfly valves, and poppet valves. Gas valves may be actuated manually, electrically, or pneumatically. Some valves allow fine control of the flow of gas and others may simply have an open and a closed position. Some applications, such as for a bead seating tool used to seat a tubeless tire on a rim, require a rapidly opening valve to provide a burst of air. Valves designed to provide a fine control of gas flow are not suitable for such applications requiring a large burst of air.

One conventional design for a rapidly opening gas valve is the butterfly valve. Conventional butterfly valves hold pressurized gas in a tank until the butterfly valve is opened, allowing a burst of pressurized gas to escape from the tank. However, the design of conventional butterfly valves suffers from limitation in the speed with which the butterfly valve can be opened, allowing the pressurized gas from a tank to escape.

SUMMARY

Various embodiments disclosed herein provide improved configurations for a rapidly opening gas valve that differs from conventional gas valve designs.

According to various embodiments, a method for quickly releasing pressurized gas through an outlet may include filling a control reservoir with pressurized gas to slide a piston located in a cylinder against a primary outlet to block primary gas from flowing through the primary outlet. The control reservoir is formed within the cylinder between the piston and a closed end of the cylinder and the gas in the control reservoir has a control pressure. Gas may be provided into a primary gas reservoir and pressurized to a primary pressure. The primary outlet is a path for the pressurized primary gas to escape from the primary gas reservoir. The pressurized gas may be released from the control reservoir through a release valve to allow the control pressure to drop below a release pressure. The release pressure is based on the primary pressure and a difference in area between an area of the primary outlet and a cross-sectional area of the piston. The cross-sectional area of the piston can be closer in size to the cross-sectional area of the outlet so long as the piston is sufficiently tight within the cylinder—that is, so long as a relatively small amount of air leaks past the piston into the control reservoir. If the control pressure drops below the release pressure, the piston quickly slides away from the primary outlet allowing the primary gas to escape through the primary outlet.

A gas valve may have various embodiments that include a primary gas reservoir having a primary gas outlet with an outlet area. A receptacle with one closed end is fixedly positioned inside the primary gas reservoir. A piston positioned in the receptacle is shaped to fit in the receptacle and has a cross-sectional area greater than the outlet area of the primary gas outlet. The piston is able to slide in a reciprocating motion in the receptacle and a control reservoir is created in the receptacle between the closed end of the receptacle and the piston. The volume of the control reservoir is dependent on a position of the piston in the receptacle. Means for filling the control reservoir with control gas to a control pressure and a release valve is also included. The input of a release valve is pneumatically coupled to the control reservoir. If the control pressure of the control reservoir is greater than a release pressure, the piston is seated against the primary gas outlet, blocking gas from leaving the primary gas reservoir. The release pressure is dependent on a primary pressure of the gas in the primary gas reservoir and a difference in area between the outlet area and the cross-sectional area of the piston. If the release valve is opened and the gas in the control reservoir escapes through the outlet of the release valve causing the control pressure of the gas remaining in the control reservoir to drop below the release pressure, the piston quickly slides into the receptacle, away from the primary gas outlet, allowing the gas in the primary gas reservoir to flow through the primary gas outlet.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 6A and 6E depict exploded views of a rapid air release valve (RAR valve) according to various embodiments disclosed herein.

DETAILED DESCRIPTION

The present inventor recognized a problem with conventional design. Namely, the conventional designs of bead seating tools feature a tank size that is either too large (for sufficient air volume) or too heavily reinforced (for sufficient pressure) to be conveniently used in order to attain a burst of air sufficient to mount a tubeless tire on a wheel rim. The inventor recognized that by having a simple valve that could open more quickly than conventional ball valves or butterfly valves of conventional designs, a smaller, more easily portable tank might be used. The present invention provides a simple, low cost, pneumatically controlled, rapid-opening, gas valve that may be used for a bead seating tool or other applications. In this way, valves according to the various embodiments disclosed herein can be used with smaller, more easily portable, sized tanks.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

FIGS. 1, 2, 3A, 3B, 4A, and 4B all show the same embodiment of a pneumatically controlled, rapid-opening, gas valve 100. Therefore, the same reference numbers are used throughout these drawings and reference may be made to the various drawings in the description.

Figure 1:
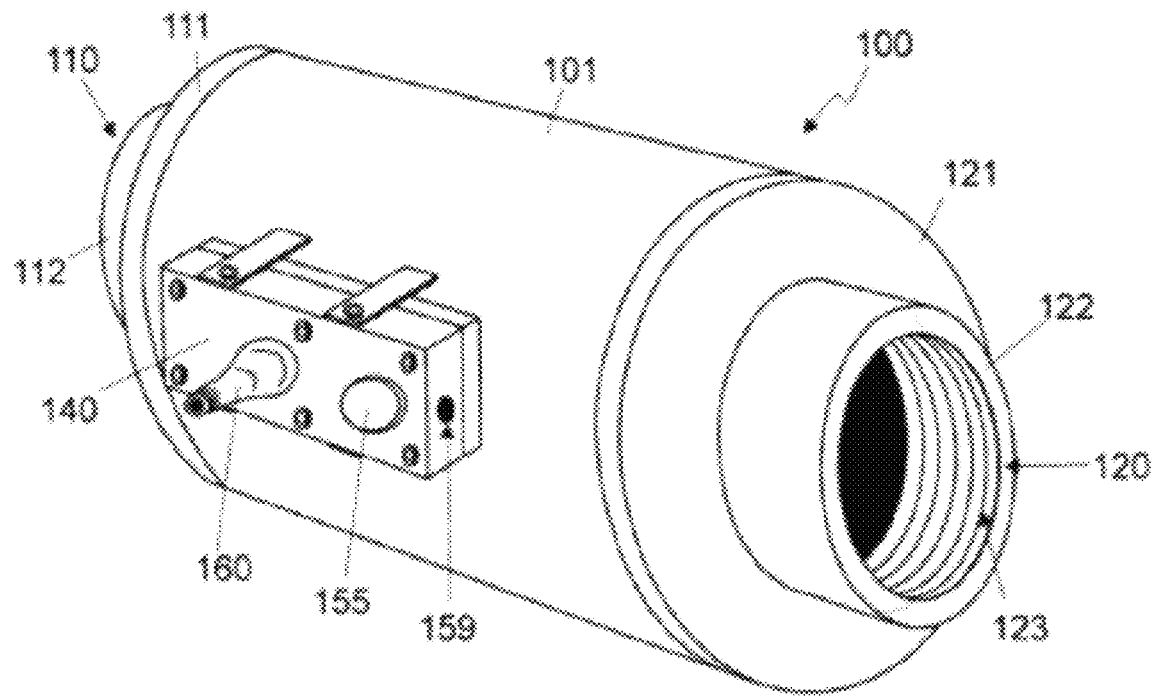
FIG. 1 shows an isometric view of an embodiment of a pneumatically controlled, rapid-opening, gas valve.
Figure 2:
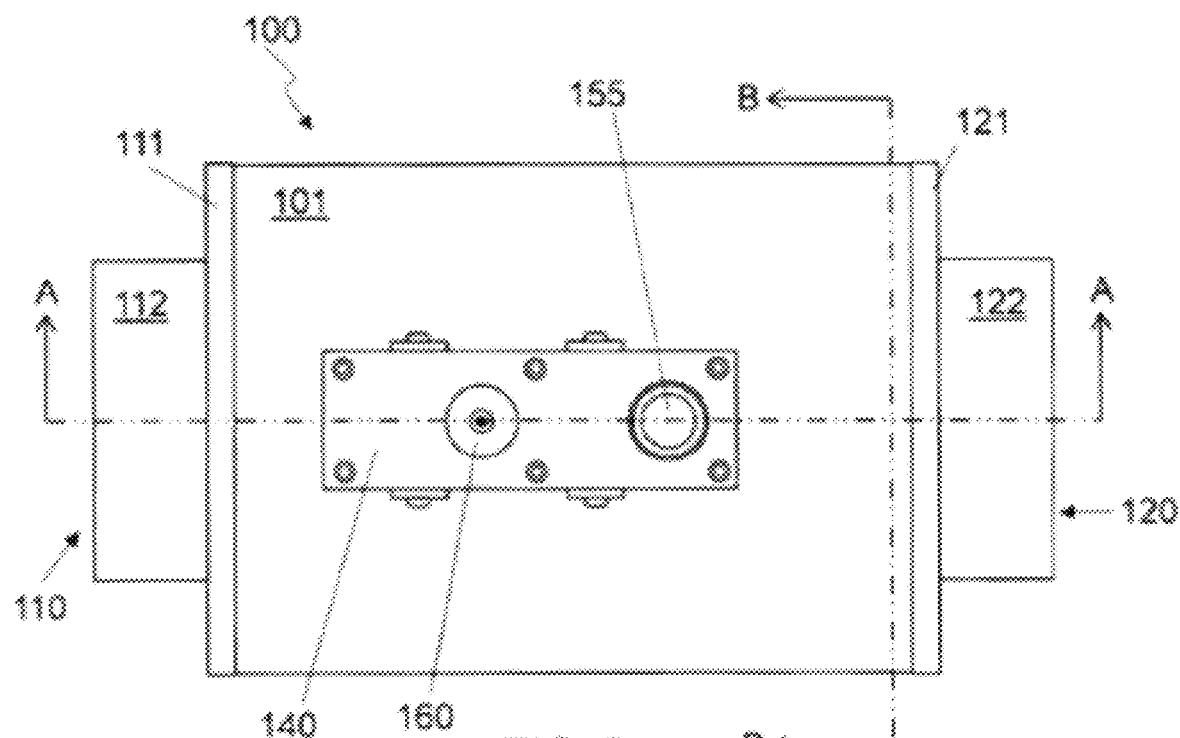
FIG. 2 shows a top plan view of the gas valve of FIG. 1.

FIG. 1 shows an isometric view and FIG. 2 shows top plan view of an embodiment of the gas valve 100. The gas valve 100 may have a cylindrical body 101 with two end-caps 111, 121 attached to the body 101 to form a vessel that serves as the primary gas reservoir 105. The vessel, primary gas reservoir 105, is suitable for holding pressurized gas—for example, a metal tank similar to that of an air compressor that holds pressurized air. In other embodiments, the primary gas reservoir 105 may be formed with other configurations of parts and may have other shapes such as spherical, cubic, conical, or other volumetric shapes. In the embodiment shown, the end caps 111, 121 and the body 101 may be made of steel, aluminum, a polymer such as poly-vinyl chloride (PVC) plastic, polycarbonate plastic such as Lexan® from SABIC Innovative Plastics, acrylonitrile butadiene styrene (ABS) plastic, or other suitable materials, depending on the targeted operating pressure, size, shape, weight, cost, or other design parameters of a particular embodiment. The end caps 111, 121 may be attached to the body 101 using a method appropriate for the material used, including, but not limited to, welding, gluing, screw-threads, bolts, external clamps, or other methods to create a gas-tight seal.

The input end cap 111 may have a primary gas input opening 110 formed by an input fitting 112 with threads 113 to accept gas into the primary gas reservoir 105 from an external source that may be connected to the input fitting 112. The input source may be connected to the gas valve 100 using other types of connections in some embodiments including, but not limited to, a quick-connect fitting, a sleeve fitting, or other type of connection that may be held in place with screw threads, glue, a bayonet type mount, a quick-connect, welds, friction, or other methods that allow a gas-tight, or nearly gas-tight, seal to be formed as the primary gas reservoir is pressurized. The output end cap 121 may have a primary gas outlet opening 120 formed by an output fitting 122 with threads 123. The outlet opening 120 passes through a wall of the primary gas reservoir 105 and opens to the atmosphere outside the primary gas reservoir 105. An output conduit may be connected to the output fitting 122 using the threads 123 or other types of connection as described above for the input fitting 112.

A control block 140 may be attached to the body 101 by bolts, welding, gluing or other attachment methods. A fill valve 160, a Schrader valve in the embodiment shown, may extend from the control block 140. A release valve button 155 may also be accessible and an exhaust port 159 may also be seen on one end of the control block 140. In some embodiments the control block 140 may be located away from the valve body 101 in order to control the valve from a distance. In such embodiments the control block 140 is connected to the valve by the conduit 141 which is configured to extend away from body 101.

FIG. 2 also shows two cross-sectional cutting planes. Cross-sectional cutting plane A:A shows the approximate position of the plane used for the cross-sectional views of FIGS. 3A and 4A. The cross-sectional views of FIGS. 5A, 6, 7, 8 and 9A are from a similarly positioned cutting plane in their associated embodiment. Cross-sectional cutting plane B:B shows the approximate position of the plane used for the cross-sectional views of FIGS. 3B and 4B and the cross-sectional view of FIG. 5B and are from a similarly positioned cutting plane in their associated embodiment.

Figure 3A:
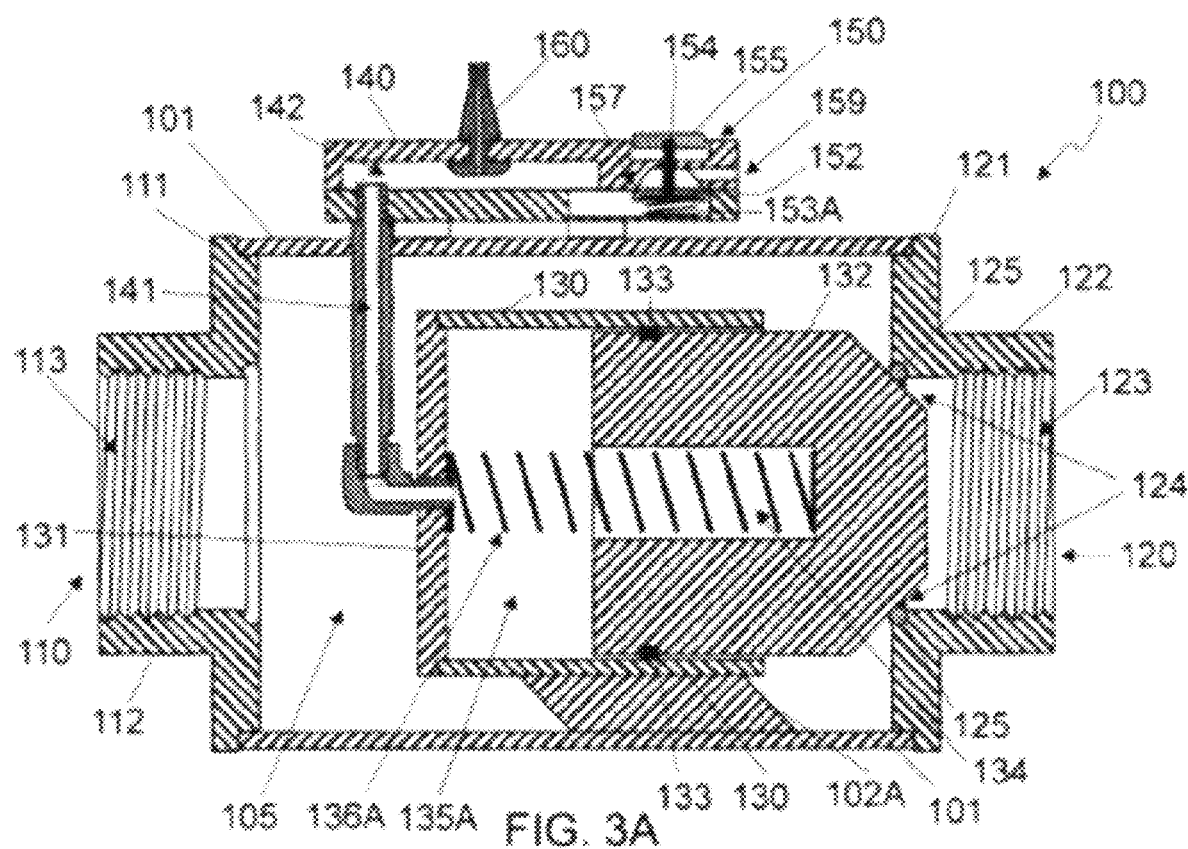
FIG. 3A shows a cross-sectional side view of the gas valve of FIG. 1 in a closed position.
Figure 3B:
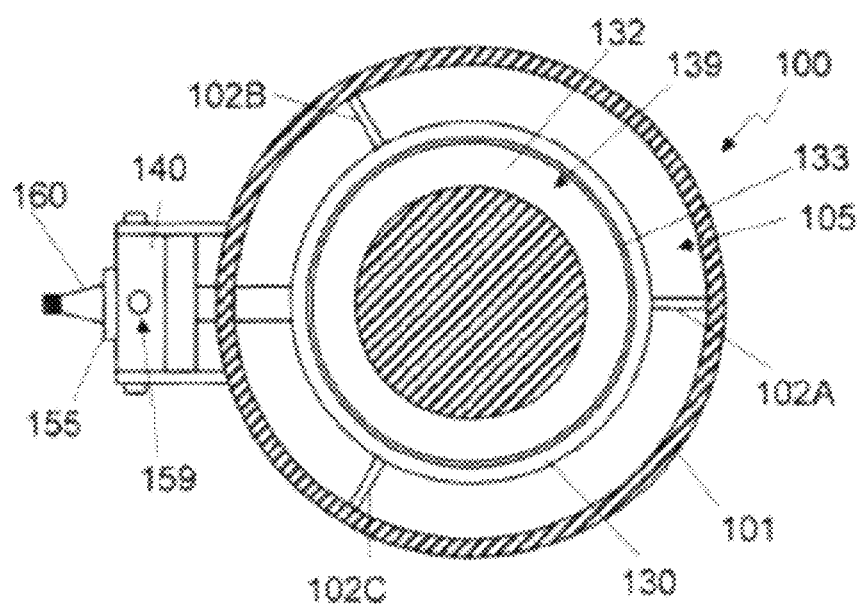
FIG. 3B shows a cross-sectional front view of the gas valve of FIG. 1 in a closed position.

FIG. 3A shows a cross-sectional side view taken from the perspective of cross-sectional cutting plane A:A of FIG. 2. FIG. 3B shows a cross-sectional front view taken from the perspective of cross-sectional cutting plane B:B of FIG. 2. FIG. 31 depicts the gas valve 100 in a closed position. A piston 132 may be seated against the primary gas outlet 124 to block gas from leaving the primary gas reservoir 105 through the primary gas outlet opening 120. A gasket, rubber O-ring 125, or other type of seal may be positioned at the primary gas outlet 124 although other embodiments may position an O-ring on the piston 132 instead. Other embodiments may not require the use of an O-ring 125, depending on the materials used for the piston 132 and the primary gas outlet 124 and manufacturing tolerances of the various parts. The piston 132 may be made of any suitable material including, but not limited to steel, aluminum, PVC, polycarbonate, ABS, and polyacetal polymers such as polyoxymethylene including Delrin® acetal resin from DuPont.

The piston 132 may be shaped to fit into a receptacle 130 with a closed end 131 and slide in a reciprocating motion in the receptacle 130. As can be seen in comparing FIG. 3A and FIG. 3B the piston 132 is configured to slide back and forth within the cylindrical receptacle 130. The device is configured so the chamfered end of piston 132 (i.e., the end opposite spring 136A) can slide beyond the edge of receptacle 130 to press against the rubber O-ring 125 or other seal positioned at the primary gas outlet 124. The other end of piston 132 remains within the cylinder receptacle 130 and is acted upon by the force of the spring 136A and the control pressure within the control reservoir 135A.

The receptacle 130 and piston 132 may be cylindrical in shape with a circular cross-section or in other embodiments may have other cross-sectional shapes such octagonal, square, ellipsoid, or other shapes. The receptacle 130 may be positioned by supports 102A, 102B, 102C to allow the piston 132 to slide into position to seal the primary gas outlet 124. The number of supports may vary between embodiments. The supports 102A, 102B, 102C may be fixed to both the outer wall of the receptacle 130 and the inner wall of the body 101 using welding, glue, bolts, or other attachment mechanisms depending on the materials used and the details of the embodiment. In other embodiments, the supports may be fixed to the outer wall of the receptacle 130 and the output end cap 121. A compressed spring 136A may be positioned between the closed end of the receptacle 131 and the piston 132 to provide force to help keep the piston 132 seated against the primary gas outlet 124. In some embodiments, the piston 132 may have a cavity 134 for positioning the compressed spring 136A and providing room for the spring as the piston 132 moves toward the closed end 131.

The piston 132 may include one or more piston rings 133 that may be fitted around the piston 132 or may be an integral part of the piston 132 and may be interposed between the piston 132 and the receptacle 130 to create a tighter seal than could otherwise be created between the piston 132 and receptacle 130 alone. It may be advantageous in some embodiments to create a tight seal between the receptacle 130 and the piston 132 while still providing for low friction between the receptacle 130 and the piston 132. The piston ring 133 may be made of a material to help minimize the friction and create a good seal such as polyacetal, nylon, leather, rubber or other like type of material known to those of ordinary skill in the art. The particular material chosen for the piston ring 133 may depend on the materials used for the piston 132 and the receptacle 130.

A control reservoir 135A may be created between the closed end 131 of the receptacle 130 and the piston 132. The piston 132 and control reservoir 135A are typically located on the same side of the primary gas outlet opening 120 as the primary gas reservoir 105. As such, the piston 132 may be thought of as holding the valve closed from within the primary gas reservoir 105, rather than from the outside of reservoir 105 (e.g., rather than from outside of primary gas outlet opening 120). The volume of the control reservoir 135A depends on the position of the piston 132 within the receptacle with the largest volume of the control reservoir 135A occurring if the piston 132 is seated against the primary gas outlet 124 as shown in FIG. 3A. A conduit 141 may pneumatically couple the control reservoir 135A and a plenum 142 in the control block 140, allowing gas to flow between the control reservoir 135A and the plenum 142. The conduit 141 may include tubing (flexible or rigid), pipe, fittings or other hardware. Gas flowing through the conduit 141 should not be considered as flowing though the primary gas reservoir 105 as the conduit 141 creates a separation between the gas in the conduit 141 and the primary gas reservoir 105. The conduit 141 may exit through the body 101. The exit point may be sealed using a rubber seal, gasket, glue, welding or other method so that gas cannot escape from the primary gas reservoir 105 around the conduit 141. The control block 140 may be fabricated differently in various embodiments but one embodiment may fabricate the control block 140 using a top section and a bottom section that are then attached using screws, glue, welding or other methods.

A release valve 150 may be positioned to have an input pneumatically coupled to the control reservoir 135A via the plenum 142 and the conduit 141. The output of the release valve 150 may be pneumatically coupled to the exhaust port 159. The release valve 150 may be a poppet valve as shown or may be any type of gas valve in other embodiments including, but not limited to, a ball valve, a butterfly valve, a diaphragm valve, or other type of valve that may be manually, electrically, pneumatically, hydraulically, or otherwise controlled. The release valve 150 may include a valve body 152 configured to mate with valve seat 157 to form a gas-tight seal. Spring 153A may provide force to keep the valve body 152 seated against the valve seat 157. A rod 154 may connect the valve body 152 to the release button 155. In an alternative embodiment the exhaust port 159 may pneumatically coupled to the primary gas output opening 120 via a conduit. In such embodiments the exhaust port 159 vents into the gas output 120 (or into a barrel attached to the gas outlet 124, if any) rather than out into the atmosphere. This allows gas exiting from the valve through the gas outlet 124 to aid in helping the spring 136A in pushing the piston 132 rapidly back to a closed position and may also aid somewhat in pushing the piston back 132 to open the valve.

The fill valve 160, which may also be called a control gas inlet, allows gas from an external source to enter the plenum 140 and flow through the conduit 141 into the control reservoir 135A without first flowing through the primary gas reservoir. As the control reservoir 135A is pressurized to a control pressure, the gas in the control reservoir 135A provides additional force on the piston 132 to push the piston 132 against the primary gas outlet 124. The control reservoir 135A may be filled with gas and pressurized using various methods in various embodiments, some of which are described below.

The gas reservoir of high pressure gas that is released by the valve is, in practice, typically much larger in volume than control reservoir 135A. This may be achieved by connecting primary gas reservoir 105 to a source of pressurized gas via the primary gas input opening 110. The source of pressurized gas may be a tank or other reservoir, or a high pressure gas line, that connects to primary gas reservoir 105 via primary gas input opening 110. Gas may enter the primary gas reservoir 105 using various methods in various embodiments but in the embodiment shown in FIG. 1, the gas may enter through the primary gas input opening 110 to pressurize the primary gas reservoir 105 to a primary pressure. If the gas valve 100 is in the closed state as shown in FIG. 1, in many applications the pressure at the primary gas output opening 120 may typically be at standard atmospheric pressure although in some embodiments, the pressure at the primary gas output opening 120 may be at some other pressure level although the calculations below are based on the pressure at the primary gas outlet opening 120 being at the pressure of the surrounding atmosphere if the gas valve 100 is closed. Other pressure levels are measured with respect to the pressure of the surrounding atmosphere.

The closing forces operating on the piston 132 include the force of the compressed spring 136A and the force of the gas in the control reservoir 135A operating on the piston 132 which is equal to the control pressure times the cross-sectional area of piston 132 at its largest point which will be referred to hereinafter as the piston area. In many embodiments, the piston area may be equal to the cross-sectional area of the piston at the piston ring 133. The opening forces on piston include the force of any pressure at the primary gas outlet opening 120 times the cross-sectional area of the of the primary gas outlet opening 120, hereinafter referred to as the outlet area, and the force of the gas in the primary gas reservoir 105 operating on the piston 132 which is equal to the primary pressure times the difference in the piston area and the outlet area. The area represented by the difference in the piston area and the outlet area can be seen as the annular ring 139 in FIG. 3B. The cross-sectional area of the piston 132 can be closer in size to the cross-sectional area of the outlet opening 120 so long as the piston is sufficiently tight within the cylinder—that is, so long as a relatively small amount of air leaks past the piston into the control reservoir 135A. The air in the primary gas reservoir 105 may be referred to as pressurized gas. Once the pressurized gas leaks past the piston into the control reservoir 135A it may be called control gas. Control gas in the control reservoir 135A vents out into the atmosphere through release valve 150 (sometimes called a control valve). The pressurized gas that remains contained within the primary gas reservoir 105 is released by the gas valve 100 through the primary gas outlet 124. In an alternative embodiment, one or more small holes may be provided in the cylinder allowing gas from the primary gas reservoir 105 to enter the control reservoir 135A. In this alternative embodiment the seal between the piston and the cylinder may be maximized to the extent is does not cause an undue amount of friction and slow the piston from opening.

Returning to the embodiments depicted in FIGS. 3A-B, the air leaking past the piston 132 into the control reservoir 135A when the valve is fired off (opened) should be a small fraction (e.g., less than 10%) of the air that is vented out of the control reservoir 135A via conduit 141. In some embodiments the cross-sectional area of the piston may be 50% larger than the cross-sectional area of the outlet opening. That is, in some embodiments the cross-sectional area of the piston is no greater than 150% the cross-sectional area of the outlet opening. In other embodiments the cross-sectional area of the piston is no greater than 120% the cross-sectional area of the outlet opening. In yet other embodiments the cross-sectional area of the piston is no greater than 110% the cross-sectional area of the outlet opening. At the other extreme, in other embodiments the cross-sectional area of the piston may be only 1% larger than the cross-sectional area of the outlet opening, or any percentage from 1% up to 50/o. That is, the cross-sectional area of the piston may be from 101% to 150% the cross-sectional area of the outlet opening. Values of the cross-sectional area of the piston that are larger than 150% the cross-sectional area of the outlet opening may be used, but in such configurations the opening speed of the valve is reduced accordingly and the valve may not open fully due to compression of the gas within the control reservoir. In one embodiment the cross-sectional area of the piston is 5% larger than the cross-sectional area of the outlet opening. To produce a faster opening valve the piston is fit more snugly within the cylinder to prevent pressurized air from leaking past the piston as rapidly as the piston recedes into the cylinder in response to the release valve 150 being opened to fire the valve. In configurations with a piston that is only slightly larger than the cross-section of the outlet opening (e.g., 3% larger), the piston tends to open slightly later from when the release valve is opened as compared to relatively larger piston sizes, but the later opening piston also tends to open more rapidly. In many applications the tradeoff of a slight delay in opening is worth the more rapidly opening valve.

The gas valve 100 may be opened by opening the release valve 150 by pushing on the release button 155 which uses the rod 154 to move the valve body 152 away from the valve seat 157 which also compresses the spring 153A. Opening the release valve 150 allows the pressurized gas in the control reservoir 135A to pass through the conduit 141, the plenum 142, the open release valve 150, and the exhaust port 159. This may cause the control pressure to drop toward the surrounding atmospheric pressure. As the control pressure drops, the closing force on the piston 132 is reduced. If the control pressure drops to a release pressure, the opening force on the piston 132 may exceed the closing force and the piston 132 may begin to slide within the receptacle 130 and allow gas to escape through the primary gas outlet 124 which may increase the pressure at the primary gas outlet 124. This increases the opening force on the piston 132 and even though the control reservoir 135A is being made smaller and the compressed spring 136A is being further compressed, both of which may increase the closing force on the piston 132, the increased opening force overcomes the closing force and the piston 132 slides rapidly into the receptacle, quickly opening the gas valve 100. In the inventor's estimation, many embodiments may open in less than 0.10 seconds (s) and some embodiments may open in a few tens of milliseconds (ms) such as 20-50 ms although other embodiments may open even faster and some may open more slowly than 0.10 s.

Figure 4A:
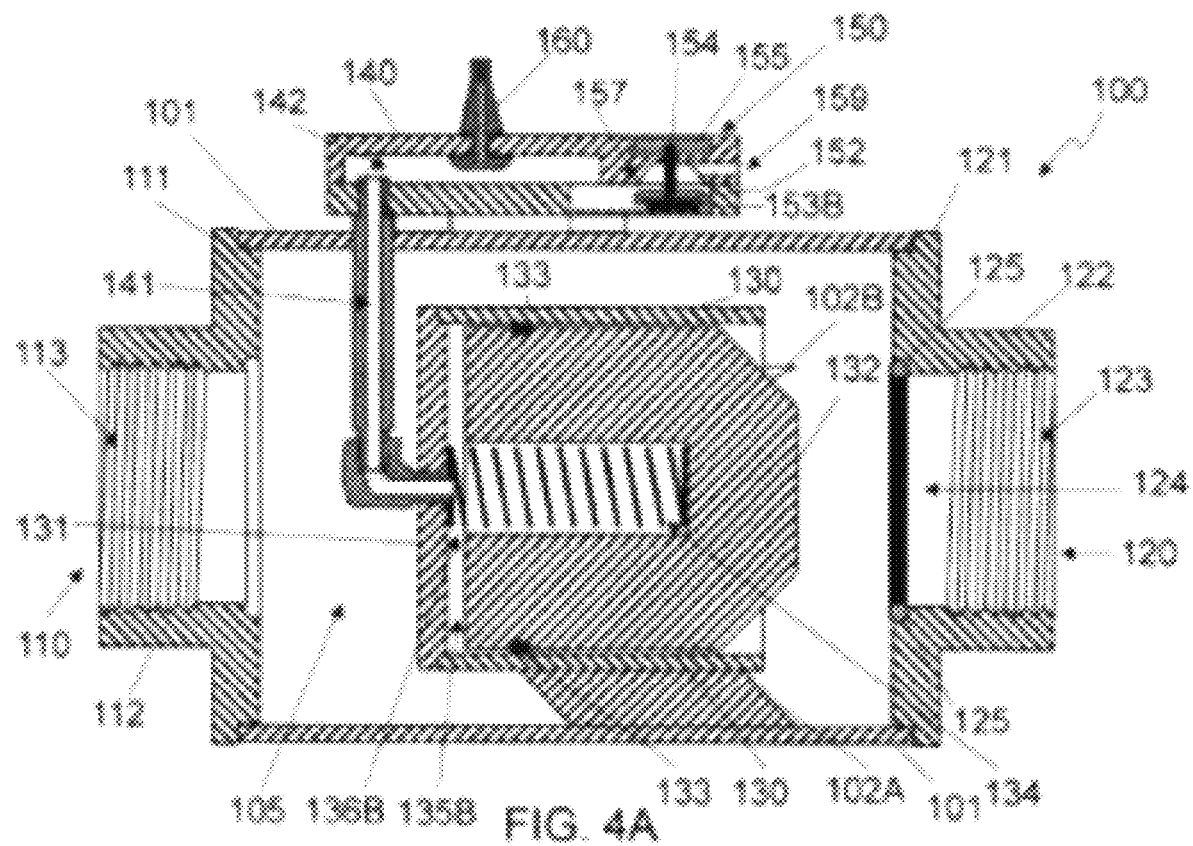
FIG. 4A shows a cross-sectional side view of the gas valve of FIG. 1 in an open position.
Figure 4B:
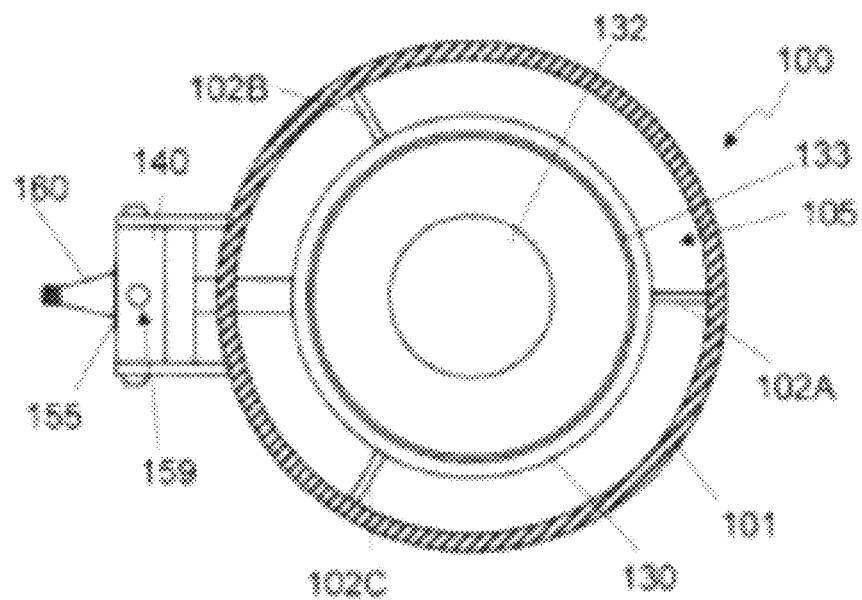
FIG. 4B shows a cross-sectional front view of the gas valve of FIG. 1 in an open position.

Referring now to FIGS. 4A and 4B which show cross sectional views of the gas valve 100 in an open position, the piston 132 has slid into the receptacle 130 to allow the gas to escape through the primary gas outlet 124. As long as the release valve 150 is held open with enough force to overcome the closing force of the spring 153B, the control reservoir 135B, now much smaller due to the position of the piston 132, may be at or near the pressure of the surrounding atmosphere, so that the only closing force on the piston is from the more compressed spring 136B. As long as enough gas flows into the input gas opening 110 to continue to create enough primary pressure in the primary gas reservoir 105 so that the primary pressure times the piston area is greater than force from the more compressed spring 136B, the gas valve 100 will tend to remain open.

The gas valve 100 may be closed in two ways. If the gas entering the gas valve 100 through the primary gas input 110 is reduced or shut off, the primary pressure in primary gas reservoir 105 is reduced and the force from the spring 135B (which is compressed when the valve is open) will tend to push the piston against the primary gas outlet 124, closing the gas valve 100. The closure of the gas valve 100 due to pressure of spring 135B when the pressure within primary gas reservoir 105 falls to a sufficiently low level can occur independent of the position of the release valve 150—that is, with the release valve 150 open or closed, depending upon the pressure in reservoir 105. The second manner of the release valve 150 being closed involves gas being provided to pressurize the control reservoir 135B to a point that the control pressure provides enough closing force on the piston 132 to overcome the opening force from the primary pressure. This causes the piston 132 to slide shut and push against the primary gas outlet 124, closing the gas valve 100. These two forces—the force of spring 135B and the force due to the pressure in control reservoir 135B—may act together in closing the valve.

The gas valve 100 may be built with various dimensions in various embodiments designed for use in different applications. In one embodiment, the input fitting 112 and output fitting 122 may be designed to mate with 1.5 inch (in.)

threaded pipes, 2.0 inch threaded pipes or other such diameters. The inside diameter of the cylindrical receptacle 130 is typically within a range of from 1.6 in. to over 2.25 in., with one embodiment using a cylinder with an inside diameter of about 1.8 in. for the receptacle. Based on the inventor's experiments, if the area of the inside of the receptacle 130 is at least 10% larger than the area of the primary gas outlet 124, the gas valve 100 operates well. Other embodiments may use a wide range of sizes for the primary gas outlet 124 and for the receptacle 130, for example, in some embodiments the receptacle 130 size may vary within the range of 0.25 inch to 12 inches, with correspondingly sized inputs, outputs and fittings. In yet other embodiments the size of the body 101 can be any size as long as enough space is left between the receptacle 130 and the body 101 for the free flow of gas but in one embodiment, the body 101 is a cylinder about 4 in. in diameter. The conduit 141 may be of various sizes but some embodiments may use a ⅛ in. and others may use ¼ in. pipe and fittings. Other embodiments may use larger pipes or tubes with various fittings.

Some applications of the gas valve 100 are for use with compressed air at up to about 150 pounds per square inch (psi). So some embodiments may be designed for use at up to 150 psi of pressure in the primary gas reservoir 105. Other embodiments may be designed for use at lower pressures, such as under 100 psi or under 50 psi. Some embodiments may be designed for use with gas at low temperatures, such as under 100 degrees Celsius (C). Other embodiments may be designed for use at much lower or much higher temperatures. The intended operating temperature may impact the choice of materials and construction techniques used.

Figure 5A:
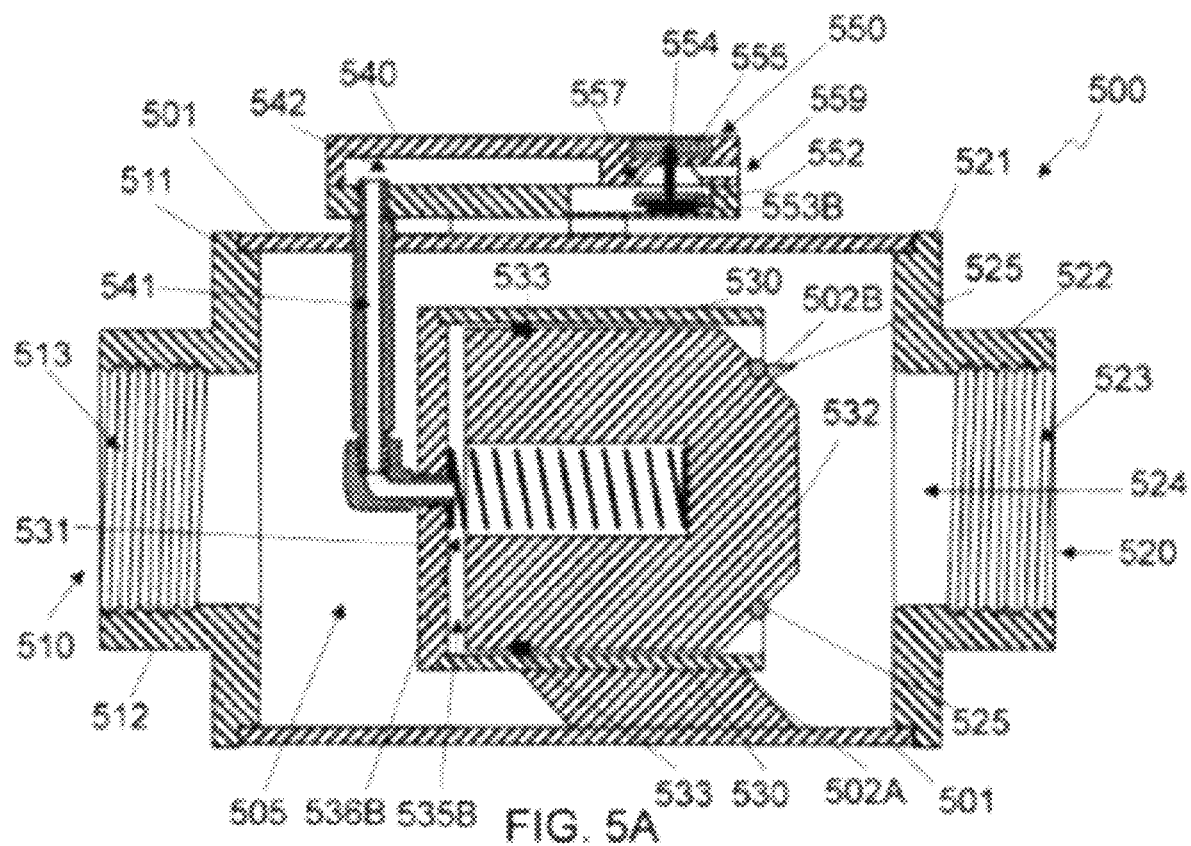
FIG. 5A shows a cross-sectional side view of an alternate embodiment of a gas valve in an open position.
Figure 5B:
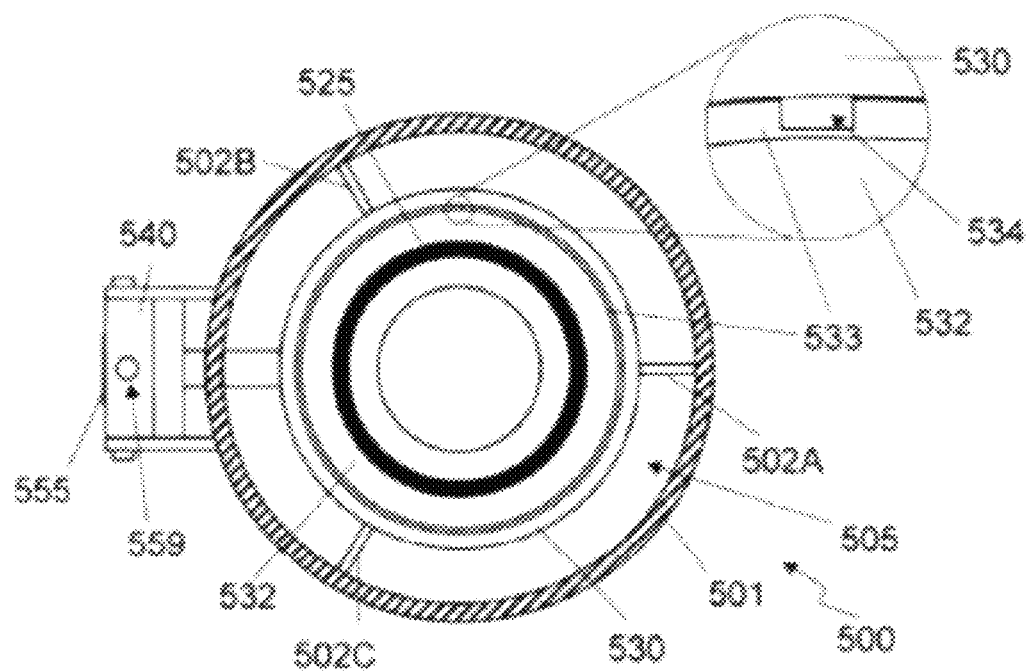
FIG. 5B shows a cross-sectional front view of the alternate embodiment of a gas valve in an open position.

FIG. 5A shows a cross-sectional side view, and FIG. 5B shows a cross-sectional front view of an alternate embodiment of a gas valve 500 in an open position. The embodiment shown in FIGS. 5A and 5B is quite similar to the gas valve 100 discussed above and may use similar materials and constructions techniques. The gas valve 500 may have a cylindrical body 501 with two end-caps 511, 521 attached to the body 501 to form a primary gas reservoir 505. The input end cap 511 may have a primary gas input opening 510 formed by an input fitting 512 with threads 513 to accept gas into the primary gas reservoir 505 from an external source that may be connected to the input fitting 512. The output end cap 521 may have a primary gas outlet opening 520 formed by an output fitting 522 with threads 523. An output pipe may be connected to the output fitting 522 using the threads 523 or other types of connection.

A piston 532 may be shaped to fit into a cylinder 530 with a closed end 531 and slide in a reciprocating motion in the cylinder 530. The cylinder 530 may be positioned by supports 502A, 50213, 502C to allow the piston 532 to slide into position to seal the primary gas outlet 524. A compressed spring 536B may be positioned between the closed end of the cylinder 531 and the piston 532 to provide force to help keep the piston 532 seated against the primary gas outlet 524. A gasket or O-ring 525 may be positioned on the piston 532 to better seal against the primary gas outlet 524 if the gas valve 500 is closed.

The piston 532 may include one or more piston rings 533 that may be fitted around the piston 532 or may be an integral part of the piston 532 and may be interposed between the piston 532 and the cylinder 530. The piston ring 533 of the embodiment shown may have one or more notches 534 configured to allow for a controlled flow of gas between the primary gas reservoir 505 and the control reservoir 535B that may be created in the cylinder 530 between the closed end 531 of the cylinder 530 and the piston 532. Other embodiments may use a piston ring 533 that has been cut and is sized such that if it is positioned on the piston 532, a gap is left between the two ends of the cut piston ring 533.

A control block 540 may be attached to the body 501. A conduit 541 may pneumatically couple the control reservoir 5351 and a plenum 542 in the control block 540, allowing gas to flow between the control reservoir 535B and the plenum 542. A release valve 550 may be positioned in the control block 540 to have an input pneumatically coupled to the control reservoir 535B via the plenum 542 and the conduit 541. The output of the release valve 550 may be pneumatically coupled to the exhaust port 559. The release valve 550 may include a valve body 552 configured to mate with valve seat 557 to form a gas-tight seal. A rod 554 may connect the valve body 152 to the release button 155. If primary pressure is maintained by having gas flow into the primary gas reservoir 505 from the gas input opening 510, then as long as the release button 555 is pressed, gas is free to flow from the control reservoir 535B out of the exhaust port 559, keeping the control reservoir 535B at a low pressure so that the gas valve 500 remains open.

If pressure holding the release button 555 down is removed, spring 553B may provide force to push the valve body 552 against the valve seat 557 and blocking the flow of gas out of the exhaust port 559. If this occurs, gas may flow from the primary gas reservoir 505, though the one or more gaps 534 in the piston ring 533 and eventually pressuring the control reservoir 535B to a control pressure approaching the primary pressure. As this occurs, the closing force on the piston 532 may eventually exceed the opening force due to the force from the compressed spring 536B, and the piston 532 may slide against the primary gas outlet 524, closing the gas valve 500.

By using one or more small gaps 534 in the piston ring 533, gas may flow from the primary gas reservoir 505 to fill the control reservoir 535B. But the small size of the gaps 534 may not allow the gas to flow fast enough to equalize the pressure between the primary gas reservoir 505 and the control reservoir 535B. The pressure differential created allows the closing force and opening forces on the piston 532 to work as described above.

In the embodiment shown, some gas may flow from the primary gas reservoir 505, through the gap 534, the control reservoir 535B, the conduit 541, the plenum 542, the release valve 550 and out the exhaust port 559 while the release valve 550 is held open. This may be fine for some applications while other applications may not tolerate that type of gas leakage.

The size and number of gap 534 required may depend on several factors including, for example, the rate of increase of the pressure in the primary gas reservoir 505, the maximum volume of the control reservoir 535 and the fit of the piston 532 in the cylinder. It is expected that for some of the applications envisioned by the inventor, one gap 534 about 0.25 inch wide and about 0.05 inches deep should allow the gas valve 500 to operate properly. Other applications may utilize a different number and/or size of gap 534 in the piston ring 533.

In another embodiment of gas valve 500, the input fitting 512 and threads 513 may be designed to mate with a standard carbon-dioxide ($CO_2$) tank with a CGA320 fitting that may contain $CO_2$ at 800 psi or more. In the embodiment using $CO_2$, the primary gas outlet 524 may have a diameter of 0.47 in. and the cylinder 530 may have an inside diameter of 0.61 in with the body 501 having a 2 in. diameter and a 0.095 wall thickness. Other embodiments may use different dimensions depending on the gas and pressure used as well as the specifics of the application. Some embodiments may be designed for use with nitrogen, helium, air or other gases at pressures ranging from a few psi to several thousand psi.

FIG. 6A depicts an exploded view of a rapid air release valve 600 (RAR valve 600) illustrating the component parts that are configured as part of the RAR valve 600, according to various embodiments disclosed herein. The RAR valve 600 includes a cylinder 610 and piston 614. The endcap 606 is fastened to the proximal end of cylinder 610. The cylinder 610 extends into the air tank where pressurized air is contained. The cylinder 610 includes a cylinder collar portion 609 that is positioned just outside the hole in the tank through which the cylinder 610 extends. The collar portion 609 and cylinder 610 extending into the tank can be seen in the cutaway view of FIG. 7B. In the embodiment depicted in FIG. 6A the collar portion 609 has a greater diameter than the rest of the cylinder 610. In some embodiments the collar portion 609 may have the same diameter as the adjacent portion of cylinder 610, and in other embodiments the collar portion 609 may have a smaller diameter than the adjacent portion of cylinder 610. In various embodiments the endcap 606 is welded to the cylinder 610. The piston 614 has an outside diameter that is slightly smaller than the inside diameter of the cylinder 610. The piston 614 fits within the cylinder 610, and is loose enough to slide back and forth in the cylinder with little resistance.

The spring 612, a compression spring, is positioned in a partially compressed state within the cylinder 610 between the endcap 606 and the piston 614. One end of the spring 612 pushes against the endcap 606 which is attached to cylinder 610. The other end of the spring 612 pushes against the piston 614 which is free to move back and forth within the cylinder 610 from the open position (proximal direction; back) to the closed position (distal direction 675; forward). With the air tank empty the spring 612 tends to push the piston 614 in the distal direction 675 to the closed position—that is, to close the valve 600. Direction 675 is called the distal direction because, upon opening the RAR valve 600, the pressurized air blows outward away from the user in the distal direction 675.

The force exerted by the spring 612 has an effect on the operation of the various RAR valve embodiments. The spring must have a sufficient spring rate—that is, produce a sufficient force—to close the RAR valve with the tank empty. A higher spring rate also aids in reducing the force with which the piston hits the endcap 606 as the piston slams to its open position as compared to a spring characterized by a lower spring rate. A third consideration is that, over time impurities from impure air pumped into the tank could possibly build up on the internal parts of the RAR valve, thus resulting in friction on the piston as it moves back and forth in the cylinder. A spring with a higher spring rate is able to overcome a certain amount of friction in the cylinder due to the build-up of impurities, making it less susceptible to malfunctions. However, not all the characteristics of a high spring rate spring are beneficial to the RAR valve. The higher the spring rate, the more force it takes to open the valve. A spring having too high of a spring rate will tend to make the RAR valve open more slowly, or not at all, as compared to a spring with just enough spring rate to push the piston to the closed position when the air tank is empty. Thus, the choice of spring rate involves a trade-off between the speed at which the RAR valve opens and reliability of the RAR valve.

The spring 612 shown in FIG. 6A has an outside diameter of approximately 1.5 inches and 3.0 inches long in its uncompressed state. The spring 612 is slightly smaller than the inside diameter of the cushion 608 so that it can be placed against the endcap 606 with the cushion 608 fitting snuggly around it. The cushion 608 aids in cushioning the piston 614 as it slams back towards the endcap 606 in response to the RAR valve 600 opening. The cushion 608 may be a flexible material such as polyacetal, nylon, leather, rubber or other like type of material known to those of ordinary skill in the art. Alternatively, the cushion 608 may be another spring shorter and stiffer than the spring 612 and having a diameter either smaller than, or larger than, the spring 612. In yet other embodiments, the cushion 608 may be a single spring with dual spring rates—that is, two sections having different spring rates.

FIG. 6E depicts an exploded view of an RAR valve 650 illustrating component parts, according to various embodiments disclosed herein. This embodiment 650 has the same basic components as embodiment 600 depicted in FIG. 6A-except for differences in the piston ring, the piston and the lock collar. Embodiment 650 as depicted in FIG. 6E includes lock collar 680, a distal O-ring 618, a piston 615, a proximal O-ring 6777, a spring 612, a cushion 608, a cylinder 610, an endcap 606 and a conduit 604. Note that the embodiment 650 lacks a piston ring 616 of embodiment 600, and instead has a proximal O-ring 677. One advantage of the embodiment 650 which doesn't have a piston ring 616 is that the piston 615 can be more easily removed through the front of the cylinder 610 for cleaning or repair, and then reassembled.

The embodiment 650 has a proximal O-ring 677 on the piston 615 instead of having a piston ring 616 like embodiment 600. The piston 615 of FIG. 6E has an O-ring trough 633 configured to accept the proximal O-ring 677. The O-ring trough 633 is shallow enough to push the proximal O-ring 677 outward against the inner wall of cylinder 610. The O-ring trough 633 may be positioned around piston 615 anywhere along its length. However, in at least some implementations the O-ring trough 633 is positioned away from the proximal end of piston 615 approximately ¼ inch (that is, ¼ inch in the distal direction 675 away from the proximal end of piston 615). The control gas holes 635 pass from the proximal end of piston 615 to the O-ring trough 633.

The control chamber 611 is the area between the proximal end of piston 615 and endcap 606 and includes any hollowed out portion of piston 615 (that is, hollowed out from the piston 615's proximal end). The control chamber 611 with the piston in the closed position is indicated by the dotted lines on FIG. 6D. The control gas holes 635 on piston 615 of FIG. 6B serve as a means for filling the control chamber 611 (shown in FIG. 6D) by providing for constrained pneumatic communication between the air tank and the control chamber 611. The control gas holes 635 allow high pressure air from within a high pressure tank connected to the valve (or other source of pressurized gas) to pass past the piston 615 into control chamber 611 (sometimes called control reservoir). The piston 615, with proximal O-ring 677 fitted around it but without control gas holes 635, would tend to prevent high pressure gas from the tank from passing into the control chamber 611. The control gas holes 635 allow the pressurized air to bleed past the piston 615 as tank is being filled at a rate fast enough to keep the pressure in the control chamber 611 relatively close to the pressure within tank. The pressure in control chamber 611 in combination with the force of spring 612 keep the valve 650 closed while the tank is being filled with pressurized gas, e.g., pressurized air.

Various embodiments may have more than two control gas holes 635. For example, the RAR valve with three or more control gas holes 635 spread equidistance around the back of the piston. The RAR valve can also be implemented with only one control gas hole 635, but this unbalanced implementation may cause the piston 615 to shimmy slightly as it is pushed back into the open position. The two control gas holes 635 are approximately 0.25 inch long and 0.08 inch (2 mm) in diameter. In other embodiments more control gas holes 635 the holes are spread symmetrically around the proximal side of piston 615 and have approximately the same total gas flow capacity as the two control gas holes 635 mentioned above that are approximately 0.25 inch long and 0.08 inch (2 mm) in diameter. In some implementations the control gas holes 635 may pass from the O-ring trough 633 to the side of the piston 615 near its proximal end—that is, in the space between the piston 615 and the adjacent cylinder wall. In these embodiments the side of the piston may itself have a small trough or groove on its side from the control gas holes 635 to the proximal end. In yet other implementations the control gas holes 635 may pass from the O-ring trough 633 to inside the hollowed out portion at the proximal end of the piston 615. In other embodiments the control gas holes 635 may pass from just ahead of the O-ring trough 633 to one of the aforementioned spots behind the O-ring trough 633. In all such implementations the control gas holes 635 are considered to pass to the proximal end of the piston 615 since they put the pressurized air within the tank in constrained pneumatic communication with the control chamber 611.

Figure 6B:
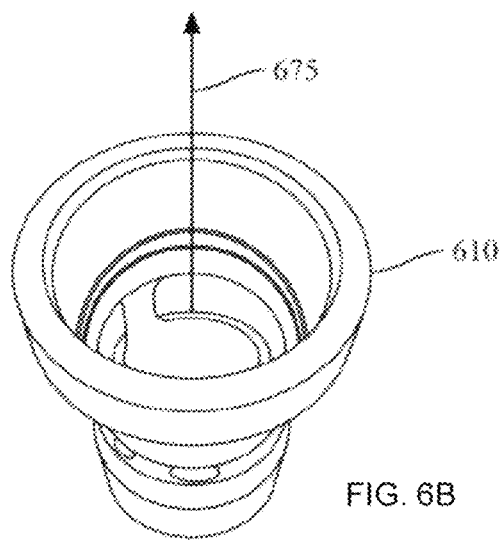
FIGS. 6B-C depict oblique views of RAR valve components according to various embodiments disclosed herein.
Figure 6C:
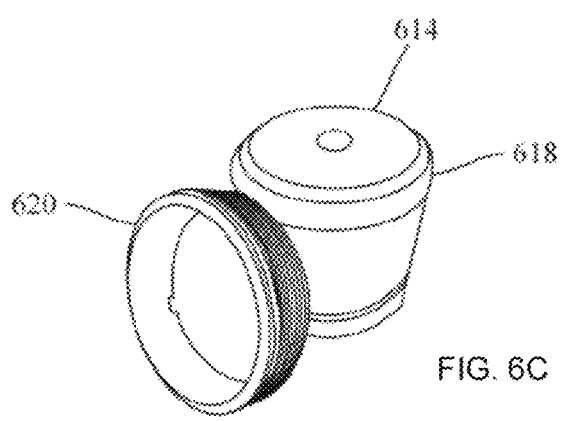

FIG. 6C depicts an oblique view of a piston 614, a distal O-ring 618 and a slotted lock collar 620 of an RAR valve 600. This view shows the male threads on slotted lock collar 620 that fit into the female threads of cylinder 610 shown in FIG. 6C to hold the piston 614 (or piston 615) in place within cylinder 610. The slots 621 of slotted lock collar 620 enable a tool to be used to remove the slotted lock collar 620 and disassemble the RAR valve 600. Upon the slotted lock collar 620 being assembled within the RAR valve 600, the slots 621 face outward in the distal direction 675. The inner edge of slotted lock collar 620 opposite the slots 621 depicted in FIG. 6C is the surface that opposes the piston 614 (or piston 615) in the closed position. The RAR valve 600 closes to seal air within the air tank by seating a flexible sealing component onto a hard surface. In various embodiments the distal O-ring 618 serves as the flexible sealing component. The distal O-ring 618 mounted on piston 614/615 seats against the inner edge of slotted lock collar 620 with the RAR valve 600 in the closed position. The closed position is air tight because the flexible sealing component—e.g., the O-ring 618—is forced against the hard smooth surface of the slotted lock collar 620, flattening the O-ring 618 to some extent and providing an air tight seal. In other embodiments the flexible sealing surface may be mounted on the RAR cylinder 610 itself (e.g., an O-ring), with a flat smooth surface provided on the piston to mate against it and provide an air tight seal.

Figure 6D:
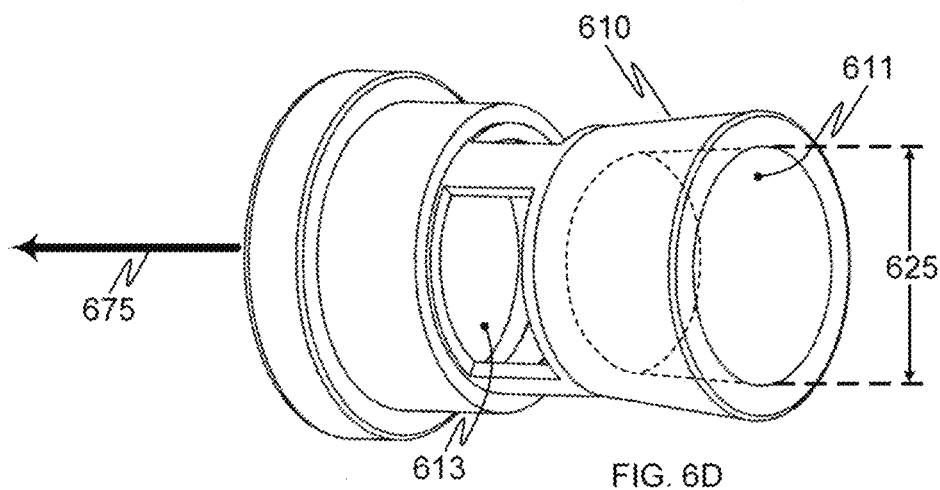
FIG. 6D depicts an oblique view of a piston, a distal O-ring and a slotted lock collar of an RAR valve according to various embodiments disclosed herein.

FIG. 6D depicts an oblique view from the side of an RAR valve cylinder 610 according to various embodiments disclosed herein. The dotted line of FIG. 6D depicts the control chamber 611 between the piston 614 (or 615) and the end cap 606, with the piston in the closed position. The cushion 608 is contained within the control chamber 611 along with spring 612. Hence, the air volume of control chamber 611 in the closed position is reduced slightly by the volume of the cushion 608 and the spring 612.

Diameter 625 is the inside diameter of cylinder 610. The various RAR valve embodiments are defined by a number of parameters, including for example, the valve diameter, the piston stroke length, the closed position control chamber volume, cylinder side-hole area. RAR valves are often characterized in terms of the valve diameter since this parameter contributes greatly to the volume of air burst produced by the valve. RAR valves are implemented in a wide range of valve diameters, e.g. from 0.125 inch to 20 inches or more. Two typical sizes are the 1.5 inch RAR valve and the 2.0 inch RAR valve. The 1.5 inch RAR valve produces a burst of air that is easily sufficient to mount an 18 wheeler truck, e.g., 11R22.5G sized tire. The 2.0 inch RAR valve produces a substantially greater burst of air than the 1.5 inch RAR valve. Further details of the RAR valve may be seen in FIGS. 7A-B.

Figure 7A:
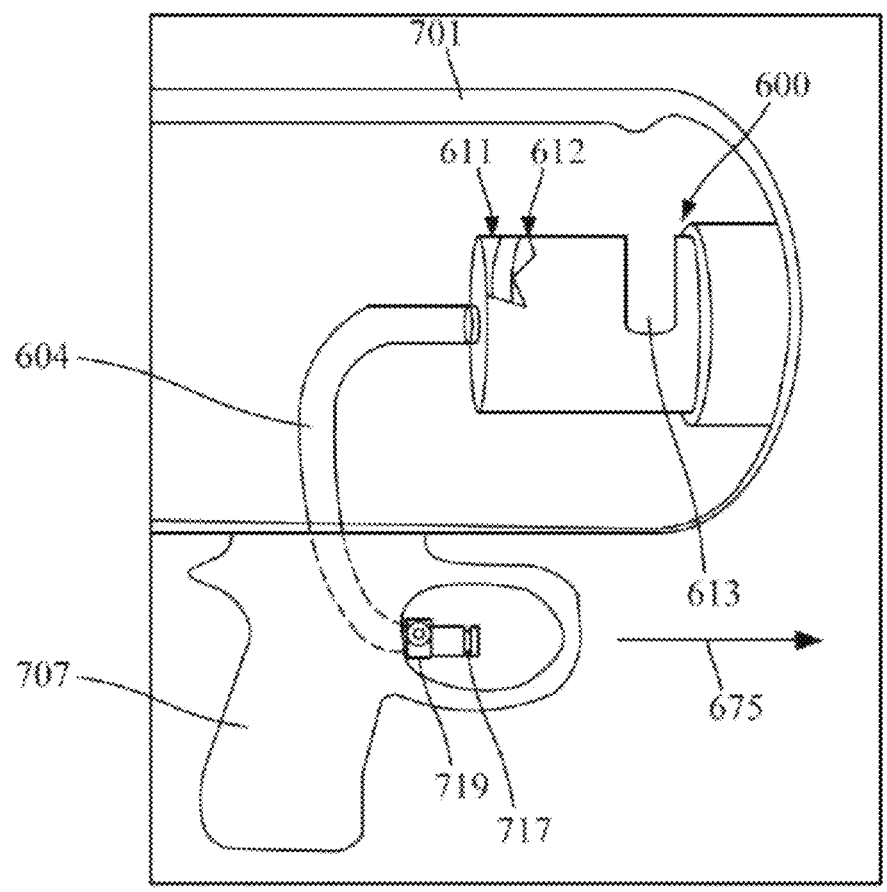
FIGS. 7A-B depict side views of an RAR pneumatic tire seater with a portion of the tank cut away to display the RAR valve inside the tank according to various embodiments disclosed herein.
Figure 7B:
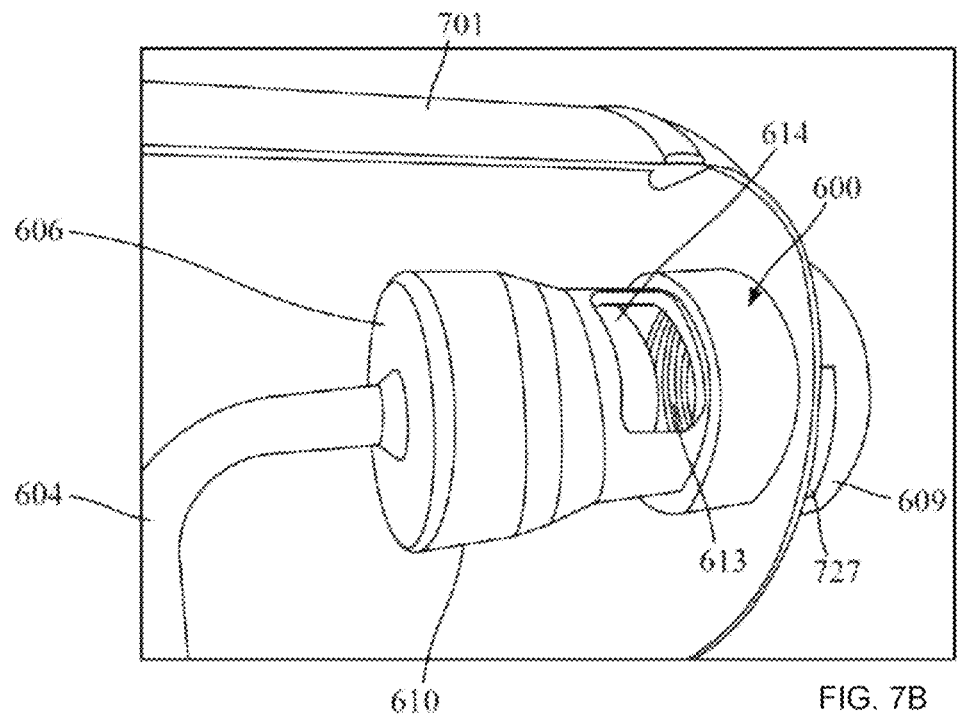

FIGS. 7A-B illustrate the piston 614 pushed back to an open state. With the tank 701 empty and piston 614 closed it takes a certain amount of force applied to the distal end of the piston 614 to begin opening the piston 614—that is, to push the piston 614 away from the point where it is seated inside the cylinder 610. The force required to begin opening the RAR valve by pushing on the piston 614 in its seated position is called the "closed-state spring force." Some embodiments have a closed-state spring force that is within the range of 0.1 ounce to 10 lbs. Various embodiments have an empty tank spring force within a number of different ranges, including the range of 0.1 ounce to 7 lbs., the range of 0.1 ounce to 5 lbs., the range of 0.1 ounce to 4 lbs., the range of 0.1 ounce to 3 lbs., the range of 0.1 ounce to 2 lbs., the range of 0.1 ounce to 1 lb., the range of 0.05 ounce to 8.0 ounces, and the range of 0.05 ounce to 4.0 ounces.

Turning again to FIG. 6C, the slotted collar 620 screws into the female threaded end of cylinder 610. The slots aid in screwing and unscrewing the slotted collar 620. The female threaded end of cylinder 610 that the slotted collar 620 screws into can be more clearly seen in FIG. 6B. The slotted collar 620 has an inside diameter that is smaller than the diameter of the piston 614, thus preventing the piston 614 from coming out the distal end of cylinder 610. The piston 614 is configured to receive a sealing gasket mounted on its distal end as depicted in FIG. 6A. The sealing gasket may be made of a flexible material to minimize friction and create a good seal such as polyacetal, nylon, leather, rubber or other like type of material known to those of ordinary skill in the art. In various embodiments the sealing gasket is an O-ring 618 fit around the distal end of piston 614. In the closed position, the O-ring 618 seats against the surface of the slotted collar 620 opposite the slotted surface. The O-ring 618 aids in maintaining an airtight seal while the valve remains in the closed position. In other embodiments the O-ring is mounted on the inside of the RAR valve opening, and the piston 614 slides forward to the closed position, coming in contact with the O-ring to form an airtight seal.

At the proximal end (back end) of the RAR valve 600 a conduit 604 is fastened between the hole on the endcap 606 shown in FIG. 6A and a hole in the tank of the pneumatic tire seater, e.g., tank 101 of pneumatic tire seater 100 depicted in FIG. 1A. A valve control mechanism controllably opens/closes to controllably connect/disconnect a control chamber in the cylinder 610 between the piston 614 and endcap 606 to the outside atmosphere via conduit 604. The valve control mechanism (e.g., 717 depicted in FIG. 7A) serves as a switch for the RAR valve to open the valve and release a blast of air from the tank.

FIGS. 7A-B depict side views of an RAR pneumatic tire seater with a portion of the tank cut away to display the RAR valve inside the tank according to various embodiments disclosed herein. The RAR valve in each of these views is pushed back and held in the open position to reveal the distal end (forward end) of piston 614. For the sake of consistency FIGS. 7A-B use the reference numbers from FIGS. 6A-C to identify components of the RAR valve.

As depicted in FIGS. 7A-B, a portion of the RAR valve extends through a hole in the air tank 701 into its interior where the pressurized air is contained. In the embodiments depicted, another small portion of the RAR valve extends out of the hole in tank 701 to the atmosphere outside the tank. In various embodiments the cylinder 610 of the RAR valve is welded to the tank 701 to affix it in an airtight manner. The bead of weld 727 connecting the two components can be seen in FIG. 7B. In other embodiments the RAR valve is threaded on an outside surface and screws into the tank 701, allowing it to be removed for repair or replacement, and to enable access to the inside of the tank 701.

The valve control mechanism 717 shown in FIG. 7A serves as a switch for the RAR valve 600 to open the valve and release a blast of air. Various other embodiments may be configured with different types of valve switch components, including for example, a lever, a button, a toggle, a switch, a rotating collar, a bar, a trigger mechanism, and other such valve switch components as are known by those of ordinary skill in the art. In various embodiments the valve control mechanism 717 may be protected by a trigger guard to avoid inadvertently opening the valve 600 and releasing a blast of air from the tank 701.

The cylinder 610 is configured with one or more air vents 613 that open into the interior of the tank 701. In the RAR valve's closed position the piston 614 with its O-ring 618 is pushed forward in the distal direction 675 to seat against the slotted collar 620 and prevent pressurized air within the tank 701 from exiting into the atmosphere. The RAR valve is in the open position with the piston 614 with its O-ring 618 pulled back in the proximal direction to unseat from the slotted collar 620 and allow pressurized air from the tank 701 to escape through the nozzle 105. There is a space within the cylinder 610 between the piston 614 and the endcap 606 called a control reservoir 611 as shown in a cutaway view in FIG. 7A. The spring 612 and cushion 608 are contained within the reservoir 611. The air pressure within the control reservoir 611 in conjunction with the force of spring 612 act to urge the piston 614 in the distal direction 675 (forward) toward the closed position.

The force of spring 612 alone isn't enough to keep the RAR valve 600 closed as it is filled with pressurized air. The combined force of spring 612 in conjunction with the air pressure in the control reservoir 611 is sufficient to keep the RAR valve 600 in the closed position, so long as the pressure within the control reservoir 611 remains within a predetermined percentage of pressurized air in the tank. The predetermined percentage depends on the spring rate (stiffness) of the spring 612. A spring with a relatively higher spring rate (more stiff) requires more of a drop in the pressure of the control reservoir 611 in order to pull the piston 614 back from its closed state to an open state, as compare to a spring 612 with a spring rate just high enough to close the piston 614 with the tank 701 nearly empty (i.e., less than 5 psi of air pressure).

The air pressure in control reservoir 611 comes from pressurized air bleeding past the piston 617 as the tank 701 is filled with pressurized air. In various embodiments a piston ring 616 may be provided on the piston 614 to aid in providing a better seal between the piston 614 and the inner walls of cylinder 610, thus controlling the rate at which the pressurized air in tank 701 leaks past the piston 614. The piston ring 616 may be a spring steel piston ring (or other like type of rigid material), or may be an O-ring. Even though the piston 614, equipped with a piston ring 616, and fits snuggly within the cylinder 610, the pressurized air bleeds past the piston 614 at a rate fast enough as tank 701 is being filled to keep the pressure in the control chamber 611 relatively close to the pressure within tank 701. For example, if an air compressor with 150 psi air in an 80 gallon tank is used to fill the tank 701, the pressure within control chamber 611 remains within 95% of the air pressure in tank 701 as it is being filled. That is, the pressure within control chamber 611 mirrors the air pressure in tank 701 as it is being filled by remaining within no less than 95% of the pressure in tank 701. Once the tank 701 is full the pressure in the control chamber 611 equalizes with the pressure in tank 701 in just a few seconds-say, within no more than 5 seconds.

The air in the control chamber 611, for the purposes of this disclosure, is called "control air." As discussed above, the source of the control air is pressurized air leaking past the piston 614 as the tank 701 is being filled. The control chamber 611 is pneumatically coupled to the atmosphere (outside of the tank 701) via conduit 606 and control valve 719. The control valve 719 prevents the control air from escaping from control chamber 611 until the valve control mechanism 717 is actuated (e.g., depressed). Actuating the valve control mechanism 717 opens the path between the control chamber 611 and the atmosphere outside the tank 701 via conduit 606, allowing the control air in the control chamber 611 to freely release into the atmosphere outside the tank 701. The control air being released from control chamber 611 reduces the air pressure in the control chamber 611 that is helping to keep the piston 614 pushed forward in the closed position. As a result of the control air being released the force of compression spring 612 is no longer sufficient to maintain the valve 600 in the closed position, and the piston 614 begins to pull back in the proximal direction. As the RAR valve 600 begins to open the pressurized air from tank 701 rushing past the piston 614 aids in opening the piston 614 to the fully open position.

FIG. 7A shows the conduit 604 connects to an inlet of control valve 719. The control valve 719 is configured to vent the control air near the control mechanism 717. In other embodiments the control valve 719 may be configured with an outlet that vents air out the bottom of pistol grip 707, or out of the top of grip 707 between the tank 701 and the grip 707. The volume of control air released from the control reservoir 611 in response to opening the RAR valve 600 is not very large in comparison to the air that vents through the nozzle from air tank 701. Various embodiments release an amount of from 15 to 50 cubic centimeters of control air, depending upon the inside diameter of cylinder 610 and the stroke of piston 614 (that is, the distance the piston 614 travels back in the cylinder 610 upon opening the valve). Various implementations may have a longer piston 614 stroke so as to open the valve to a larger extent. The piston stroke may be anything within the range of 0.125 inch to 12 inches, depending upon the requirements of the implementation. Larger embodiments of RAR valves release more control air—an amount that is somewhat less than the volume of the piston 614.

The valve opening time at which various RAR valve embodiments opens is dependent upon a number of factors, including for example, the tightness of the piston 614 (and piston ring 616, if so equipped) within the cylinder 610, the diameter of the cylinder outlet (e.g., inside diameter of slotted collar 620), the air pressure in the tank, and the spring rate of spring 612. For the purpose of measuring the valve opening time, the valve begins to open as soon as the piston has traveled back 1/50th of an inch and pressurized air begins passing out the front of the cylinder. Also for the purpose of measuring the valve opening time, the valve is considered "open" as soon as it reaches 75% of the fully open position—that is, by the time the piston reaches 75% of the total distance it is capable of traveling in the proximal direction. By this time—that is, by the time the piston has traveled 75% of the way back—a great volume of air is already passing out of the valve. For all practical purposes the valve is to be considered open at this point. Thus, the valve opening time is the time it takes from when the valve begins to open and the piston has traveled back 1/50th of an inch to when the piston has traveled 75% of the total distance it is capable of traveling in the proximal direction within the cylinder.

Various embodiments are characterized by different opening times for a tank inflated to $110+/-^{10}$ psi, including but not limited to opening times having ranges of: no greater than 10 ms (milliseconds), no greater than 20 ms, no greater than 30 ms, no greater than 40 ms, no greater than 50 ms, no greater than 60 ms, no greater than 70 ms, no greater than 80 ms, no greater than 85 ms, no greater than 90 ms, no greater than 100 ms, no greater than 120 ms, no greater than 140 ms, no greater than 150 ms, no greater than 160 ms, no greater than 180 ms, no greater than 200 ms, no greater than 225 ms, or no greater than 250 ms.

Figure 8:
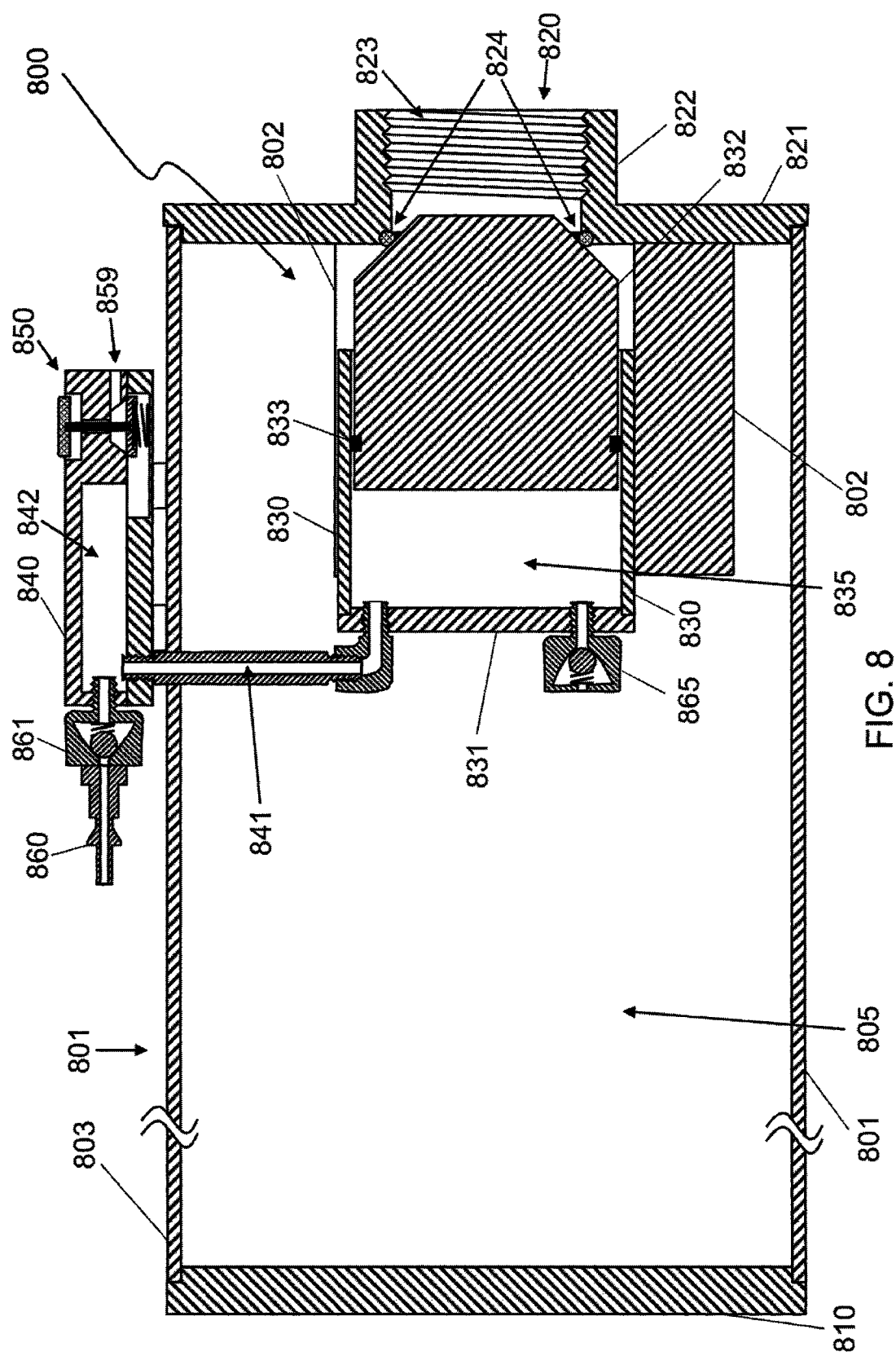
FIG. 8 shows a cross-sectional side view of an embodiment of a gas valve mounted on a pressure vessel.

FIG. 8 shows a cross-sectional side view of an alternate embodiment of a gas valve 800 mounted on a tank 801, sometimes called a pressure vessel or simply vessel. The gas valve 800 mounted in this manner extends within the vessel or tank 801. For example, the output fitting 822 is on the outside of the tank 801 and the remainder of the gas valve 800 is configured within the tank 801. The tank 801 may be made from a body 803 that may be cylindrical or some other shape, an end cap 810 and an output end cap 821. The output end cap 821 may have an output fitting 822 with threads 823 to provide a primary gas output opening 820. A cylinder 830 with a closed end 831 may be positioned inside the tank 801 using supports 802 that connect the cylinder 830 to the output end cap 821. Any number of supports 802 may be used. The cylinder 830 may be positioned to allow a piston 832 that may slide in a reciprocating motion in the cylinder 830 to push against the primary gas outlet 824 to close the gas valve 800. The piston 832 may include one or more piston rings 833 to provide for a better seal between the piston 832 and the cylinder 830 without increasing the friction too much.

A control body 840 may be mounted on the outside of the tank 801. The control body may have an quick-connect gas fitting 860 with check valve 861 to allow gas to flow from an external gas source that may be connected to the quick-connect gas fitting 860 into the plenum 842 but not allow the gas to escape from the plenum 860 back out through the quick-connect gas fitting 860. The plenum 842 is pneumatically coupled to the input of a release valve 850. The plenum 842 is also pneumatically coupled to a control reservoir 835 formed in the cylinder 830 between the piston 832 and the closed end 831 of the cylinder 830 through a conduit 841. A check valve 865 may allow gas to flow from the control reservoir 835 into the primary gas reservoir 805 but not allow gas to flow in the other direction.

If an external gas source is connected to the quick-connect gas fitting 860 while the release valve 850 is closed, the gas will flow through the plenum 842 and conduit 841 into the control reservoir 835, pressurizing the control reservoir 835 and seating the piston 832 against the primary gas outlet 824 to close the gas valve 800 and sealing the tank 801. As soon as the gas in the control reservoir 835 has enough pressure to open the check valve 865, gas flows from the control reservoir 835 into the primary gas reservoir 805 and begins to pressurize the tank 801. The control reservoir 835 may maintain a higher pressure than the primary gas reservoir 805 by at least the activation pressure of the check-valve 865 which may keep the piston 832 seated against the primary gas outlet 824 even if no spring is included although some embodiments may include a spring between the closed end 831 of the cylinder 830 and the piston 832.

After the primary gas reservoir 805 is at the desired primary pressure and the control reservoir 835 is at a control pressure, the external gas source may be disconnected from the quick-connect gas fitting 860. If the release valve 850 is opened, gas may flow from the control reservoir 835, through the conduit 841, the plenum 842, the release valve 850 and out the exhaust port 859 causing the control pressure to drop. After the control pressure drops below the release pressure, the opening force on the piston 832 may exceed the closing force causing the piston 832 to quickly slide into the cylinder 830 away from the primary gas outlet 824, opening the gas valve 800, and allowing the gas in the primary gas reservoir 805 to exit through the primary gas output opening 820.

Figure 9A:
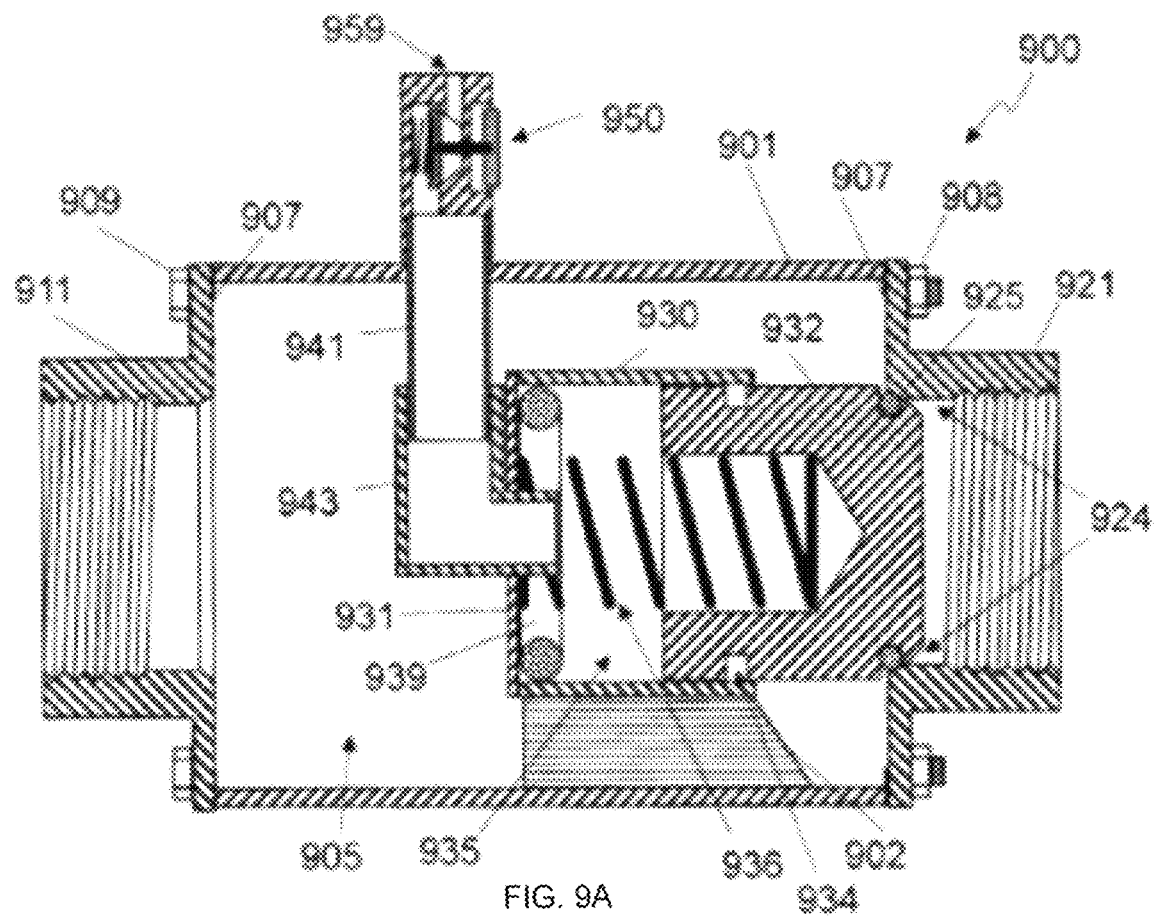
FIGS. 9A-B show cross-sectional side and front views of a different alternate embodiment of a gas valve in a closed position.
Figure 9B:
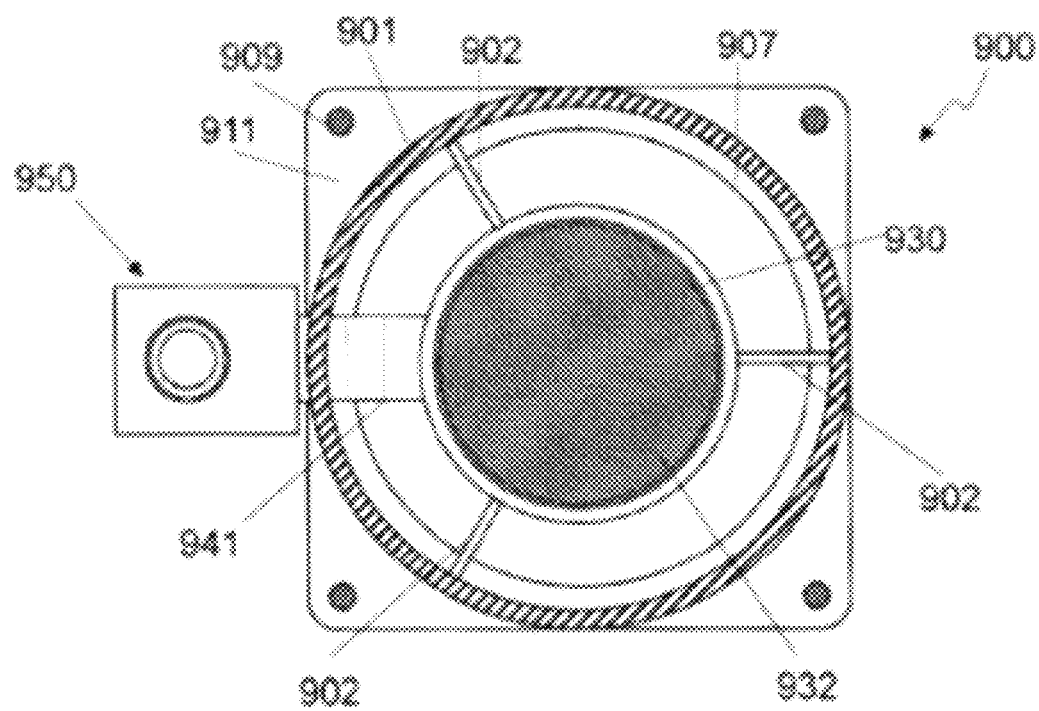
Figure 9C:
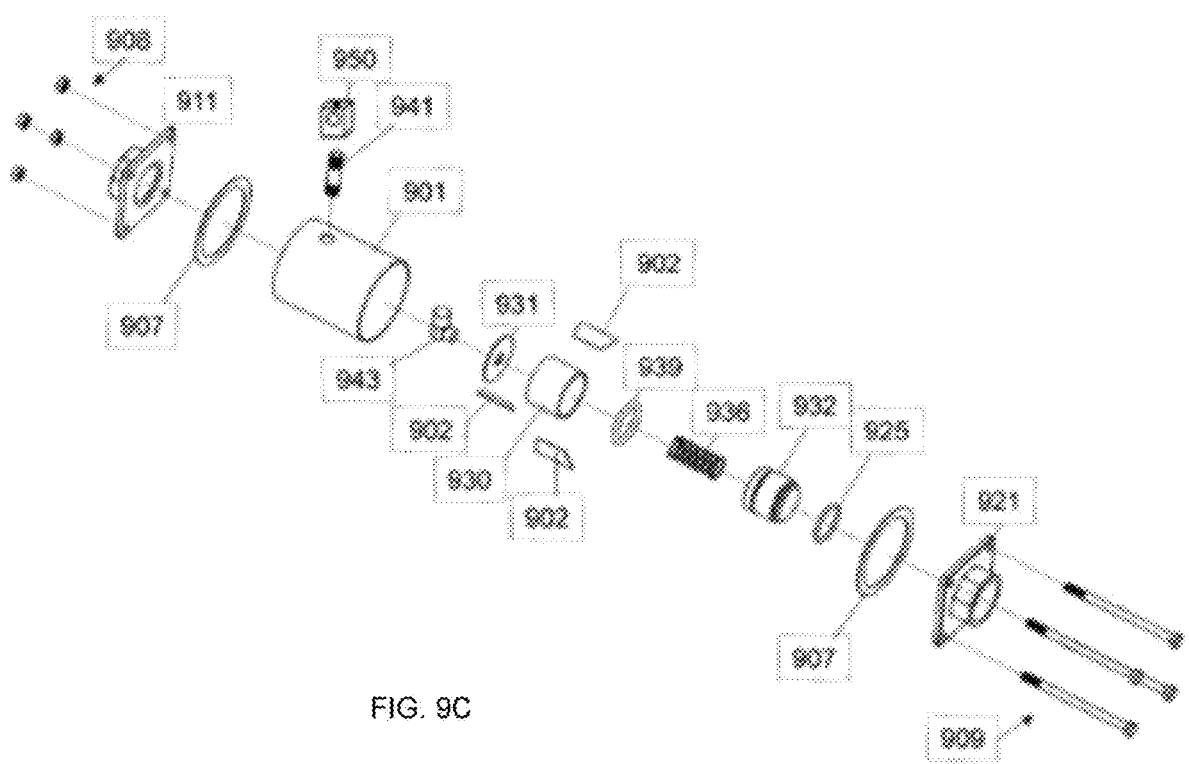
FIG. 9C shows an exploded assembly drawing of the different alternative embodiment of a gas valve.

FIG. 9A shows a cross-sectional side view and FIG. 9B shows a cross-sectional front view of a different alternate embodiment of a gas valve 900 in a closed position and FIG. 9C shows an exploded assembly drawing of the gas valve 900. Gas valve 900 may operate in a very similar way to gas valve 500 and/or gas valve 700 so many details of the construction and operation of gas valve 900 may be left out for simplicity. The gas valve 900 may be made up of a body 901 with an input end cap 911 and an output end cap 921. The two end-caps 911, 921 may be clamped onto the body 901 using four bolts 909 with nuts 908 and gaskets 907 between each end cap 911, 921 and the body 901 to help provide a gas-tight seal.

A cylinder 930 with a closed end 931 may be positioned in the body using three supports 902. The cylinder 930 may be positioned to allow a piston 932 to slide partially out of the cylinder 930 and press against the primary gas outlet 924 with the O-ring 925, to close the gas valve 900. A groove 934 in the piston 932 may be included. The groove 934 may be used to position a piston ring in some embodiments. A spring 936 positioned between the closed end 931 of the cylinder 930 to provide a closing force on the piston 932 and a large O-ring 939 may be included at the back of the cylinder 930 to provide a cushion for the piston 932 as the piston 932 slides back into the cylinder 930 quickly. A control reservoir 935 may be formed in the cylinder between the piston 932 and the closed end 931 of the cylinder 930. The control reservoir 935 may be pneumatically coupled to the input of a release valve 950 by an elbow joint 943 and conduit 941.

Figure 10A:
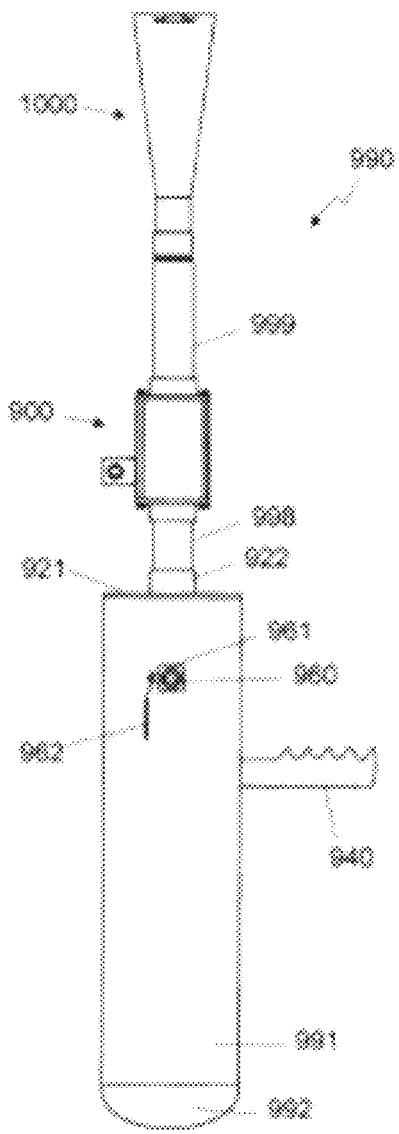
FIGS. 10A-C show a side view, an isometric view and a front view of an embodiment of a tire seating system.

If the release valve 950 is closed, gas may enter the control reservoir 935 between the piston 932 and the cylinder 930 to pressurize the control reservoir 935. If the release valve 950 is opened, gas from the control reservoir 935 may exit through the exhaust reservoir 959 to reduce the pressure in the control reservoir 935 to open the gas valve 900. The opening force on the piston 932 may not be as large as the other embodiments shown, but as discussed earlier, the difference between the diameter of the cylinder 930 and the diameter of the primary gas outlet 924 does not need to be large for operation of the gas valve 900. The small gap between the piston and the flat end of the output end cap 921 is enough to allow the pressure of the primary gas reservoir 905 to act on the annular ring of the exposed piston 932 to open the gas valve 900. FIG. 10A shows an embodiment of a tire seating system 990. The tire seating system 990 may include a pressure vessel or tank 991 with a rounded end 992 and an end cap 921 with an output fitting 922. The tank 991 may be of any size and/or shape and in some embodiments may be cylindrical while in other embodiments may be spherical or some other shape. The embodiment shown has the output fitting 921 emerging axially from the tank 991 but other embodiments may have the output fitting at other places on the tank 991. A grip 940 may be attached to the tank 991 to allow for easy handling of the tire seating device 990.

Input port 960 may allow for an external pressurized gas source to be connected to the tank 991 to fill the tank 991. Input valve 961 which may be controlled by valve handle 962 may be opened to allow the tank 991 to be filled and then closed to allow the pressurized gas in the tank 991 to remain if the external gas source is disconnected.

A first tube 998 may pneumatically couple the tank 991 to an input of gas valve 900. The gas valve 900 may be any of the embodiments described herein but the embodiment shown in FIG. 10A is described below. A second tube 999 may pneumatically couple the gas valve 900 to a nozzle 1000. The nozzle 1000 may be any type of nozzle suitable for blowing air between a rim and a tire including nozzles utilizing the Venturi effect and nozzles with multiple outlets. The embodiment shown in FIG. 10A is a conventional nozzle which will be described in more detail below.

Figure 10B:
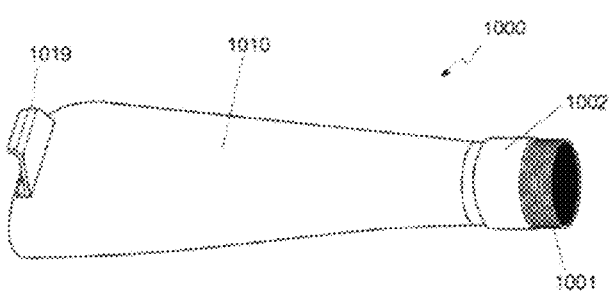
Figure 10C:
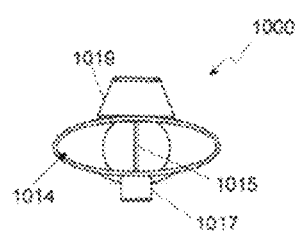

FIG. 10B shows an isometric view from above and behind and FIG. 10C shows a front view of an embodiment of a conventional nozzle 1000 that may be used in some embodiments of a tubeless tire seating device. Conventional nozzle 1000 may have a threaded fitting 1001 to mate to a source of air such as tube 999. A coupling 1002 may mate the threaded fitting 1001 to a spout 1010 that may flatten and widen as it extends away coupler 1002. The nozzle outlet 1014 of the spout 1010 may be rectangular or oval in shape or in some embodiments the nozzle outlet may be round or round with one flattened side or any other shape suitable for blowing air between a tire and rim. Brace 1015 may provide strength to the nozzle outlet 1014 to help keep it from collapsing due to pressure from the tire and/or rim. A rim bracket 1019 may be attached to the top of the spout 1010 to help a user properly position the nozzle 1000 against the lip of the rim. Tire bumper 1017 may help push the tire away from the rim as the nozzle 1000 is positioned to provide more space for the air to enter the tire.

For the sake of brevity within this disclosure the RAR valve cylinder 610, piston 614 and various other components are referred to herein and depicted as being circular in cross-section, e.g., as shown in FIG. 6A-E. However, in practice the cylinder 610, piston 614 and various other components may have a cross-section other than round— that is, they may be any number of shapes or sizes aside from having a round cross-section. For example, the various components may be implemented with cross-sections that are round, oval, oblong, square, triangular, rectangular (slotted), pentagonal, hexagonal, with rounded corners, with square, triangular or other sharp corners, a non-symmetrical shape, or other like shapes as are known to those of ordinary skill in the art. In the discussion above the RAR valve and conduit are said to be affixed to the tank by welding the parts to the tank walls. In practice, however, the various parts may be affixed to each other by any of several different fastening means, including for example, by gluing or use of other adhesives, by taping, by compression fitting, by using threaded connections, or other such means of affixing components as are known to those of ordinary skill in the art.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. § 112, 6. In particular the use of "step of" in the claims is not intended to invoke the provision of 35 U.S.C. § 112, ¶ 6.

Two components that are in "pneumatic communication" with each other, as this phrase is used herein, means that gas (e.g., pressurized air) passes between the two components. The phrases "pneumatically connected" and "pneumatically coupled" mean the same as "in pneumatic communication." More than two components can be "in pneumatic communication" (or be pneumatically connected). For example, the control chamber 611 is in pneumatic communication with the atmosphere (outside of the tank 701) via conduit 606 and control valve 719 (or are pneumatically coupled) as shown in FIGS. 7A-B. This means that (upon the control mechanism being actuated) the control gas within the control reservoir passes through conduit 606 through the control valve 719 and out into the atmosphere. Two different types of pneumatic communication are disclosed herein for the various embodiments, namely: "unconstrained pneumatic communication", and "constrained pneumatic communication." Typically, in the open position the RAR valve of pneumatic tire seater disclosed herein (e.g., FIGS. 7A-B) provides unconstrained pneumatic communication between the interior of the tank and the outside atmosphere.

Unconstrained pneumatic communication: Two pneumatically connected components that pass air between each other in a relatively unrestrained manner are said to be in "unconstrained pneumatic communication." For the purposes of defining this term (at standard atmospheric temperature and pressure (STP)), a 0.25 inch long hole with a diameter of at least 0.5 inch between two components provides "unconstrained pneumatic communication" of air or other gas between the two components. For example, a pressurized air tank connected to a nozzle with a gas valve that opens to a 0.5 inch round hole that is 0.25 inch long (between the tank and the nozzle) provides unconstrained pneumatic communication between the tank and the nozzle. Moreover, a hole of any cross-section shape or length that provides the same air flow as 0.25 inch long round hole with a diameter of at least 0.5 inch also provides unconstrained pneumatic communication of air or other gases.

Constrained pneumatic communication: Two pneumatically connected components that pass air between each other in a relatively restricted manner are said to be in "constrained pneumatic communication." For the purposes of defining this term (at STP), a 0.25 inch long hole between two components with a diameter of less than 0.5 inch provides "constrained pneumatic communication" between the two components. For example, a pressurized air tank connected to a control chamber by a 0.25 inch long round passageway that is slightly less than 0.5 inch in diameter provides constrained pneumatic communication between the tank and the control chamber. Moreover, a hole of any cross-section shape or length that provides the same air flow as 0.25 inch long round hole with a diameter of less than 0.5 inch also provides constrained pneumatic communication of air or other gases.

Some components disclosed herein are connected together in unconstrained pneumatic communication so that air can flow freely between them. For example, the RAR valve of various embodiments is in unconstrained pneumatic communication with the air storage tank or other source of pressurized gas. Other components disclosed herein are connected together in constrained pneumatic communication so that air flows between them in a restricted manner. For example, in various embodiments the RAR valve is constructed to that the control chamber (area behind the piston) is in constrained pneumatic communication with the air storage tank. Yet other components may be connected in either manner, in accordance with various embodiments. For example, depending upon the particularities of a given implementation the conduit between the control chamber and the control valve (e.g., conduit 604 of FIGS. 7A-B) may provide either constrained or unconstrained pneumatic communication between the control chamber and the atmosphere outside the air tank. Such components that may be designed either way are simply said to be in "pneumatic communication" (or said to be "pneumatically connected") without specifying the relationship to be either constrained or unconstrained.

The word "substantially" (e.g., substantially vertical or substantially one foot) as used herein in the specification and claims is meant to mean plus or minus as much as 2%. For example, substantially one foot as used herein means any length within the range of 1 foot+/−0.02 foot. Similarly, an angle of 10 degrees as used herein means any angle within the range of 10 degrees+/−0.2 degree. The word "approximately" as used herein means the same as the word "substantially." The phrase "slightly less than" as used herein, is defined to mean at least 98.5% of. For example, an outside diameter of the piston that is slightly less than the cylinder's inside diameter means that the piston's diameter is at least 98.5% of the cylinder's inside diameter. The phrase "back and forth" as used herein describing the motion of a first part relative to a second part means that the first part moves one way (e.g., distal direction) relative to the second part, and then moves the other way (e.g., proximal direction) relative to the second part. For example, a piston that moves back and forth within a cylinder moves towards a distal end of the cylinder, then changes direction to move toward a proximal direction of the cylinder.

In regards to the term "pressurized gas" (or similarly. "pressurized air") it is understood that upon releasing the pressurized gas from the air tank, the pressure of that gas drops considerably—although it is still pressurized above atmospheric pressure for a very tiny fraction of a second upon being released from the valve until reaching equilibrium with the atmosphere. To simplify the explanation herein, the pressurized air released from the air tank will still be called pressurized air even when it has been released from the tank and blown through the valve, so as to distinguish it from all other air or gases within the atmosphere outside of the air tank. In regards to the term "airtight seal" it is understood that, given enough time, nearly any tank with a valve that is filled pressurized gas will eventually leak out at least some of the pressurized gas. The term "airtight seal" as used herein is defined to mean that no more than 1 liter of a gas contained within the receptacle at 100 psi will leak past the airtight seal within a 30 minute period. The phrase "affixed in an airtight manner" is defined to mean being affixed with an airtight seal. For example, an high speed gas valve as disclosed herein that is affixed in an airtight manner to an air tank won't leak at the seam where the two components are affixed at a rate of more than 1 liter of the gas contained in the receptacle at 100 psi within a 30 minute period. The term "substantially airtight seal" as used herein is defined to mean that no more than 1 liter of a gas (e.g., air) contained within the receptacle (e.g., air tank 101) at 100 psi will leak past the airtight seal within a 10 minute period. The phrase "affixed in a substantially airtight manner" is defined to mean being affixed with a substantially airtight seal. The pistons in various embodiments configured with an O-ring as shown in FIGS. 6A and 6E forms an airtight seal against the slotted collar with the high speed valve in the closed position. In various embodiments, so long as the surface of the components are not worn, damaged, or soiled with impurities the RAR valve in a closed position will typically maintain an airtight seal for at least several hours.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A gas valve in pneumatic communication with a source of pressurized gas, the gas valve comprising:
    a cylinder affixed to the source of pressurized gas in an airtight manner;
    an endcap of the gas valve attached to a proximal end of the cylinder, the proximal end of the cylinder being in contact with the pressurized gas;
    a piston configured to slide back and forth within the cylinder, wherein a distal end of the piston is configured to move in a distal direction until coming to rest with the valve being in a closed position;

a control chamber formed within the cylinder between the endcap of the gas valve and a proximal end of the piston; and a control valve comprising a control valve inlet pneumatically connected to the control chamber and a control valve outlet pneumatically connected to atmosphere outside the gas valve;

wherein the piston is configured to allow some of the pressurized gas to leak past the piston into the control chamber;

wherein in response to opening the control valve, the piston reaches an open valve position in 50 ms or less, the 50 ms or less being measured from a time that the distal end of the piston pulls away from being at rest in the closed position, the open valve position being reached upon the piston reaching at least 75% of a total distance the piston is capable of traveling in a proximal direction.

2. The gas valve of claim 1, further comprising:
a valve control mechanism configured as part of the control valve; and
a conduit pneumatically connecting the control chamber to the control valve inlet.

3. The gas valve of claim 2, wherein, in response to the valve control mechanism being actuated, the piston moves in a proximal direction to an open position causing the gas valve to release the pressurized gas from the source of pressurized gas through one or more holes in the cylinder to an outlet of the gas valve.

4. The gas valve of claim 2, wherein the control chamber becomes pneumatically connected to the atmosphere via the conduit in response to the valve control mechanism being actuated by a human user.

5. The gas valve of claim 1, wherein the distal end of the piston is configured to contact a sealing gasket to form an airtight seal in response to the piston being moved to the closed position.

6. The gas valve of claim 5, wherein the sealing gasket is an O-ring, the distal end of the piston being configured to receive the O-ring around it, and the O-ring moves back and forth with the piston in said cylinder.

7. The gas valve of claim 2, further comprising:
a compression spring positioned within the cylinder between the endcap and the proximal end of the piston; and
a cushion positioned within the cylinder between the endcap and the proximal end of the piston.

8. The gas valve of claim 6, wherein the O-ring is a first O-ring and a cushion positioned within the cylinder is a second O-ring; and
wherein the gas valve has an opening time of no greater than 150 ms.

9. The gas valve of claim 1, wherein the pressurized gas upon leaking past the piston into the control chamber becomes control gas;
wherein; and
wherein, in response to the valve control mechanism being actuated, the control gas is vented into the atmosphere via a conduit pneumatically connecting the control chamber to the control valve inlet.

10. A method of quickly pneumatically connecting a source of pressurized gas through a gas valve, the method comprising:
providing a cylinder affixed to the source of pressurized gas in an airtight manner;
attaching an endcap of the gas valve to a proximal end of the cylinder, the proximal end of the cylinder being in contact with the pressurized gas;
configuring a piston to slide back and forth within the cylinder, wherein a distal end of the piston is configured to move in a distal direction until coming to rest with the valve being in a closed position;
forming a control chamber within the cylinder between the endcap of the gas valve and a proximal end of the piston; and
providing a control valve comprising a control valve inlet pneumatically connected to the control chamber and a control valve outlet pneumatically connected to atmosphere outside the gas valve; and
opening the control valve and causing the piston to reach an open valve position in 50 ms or less, the 50 ms or less being measured from a time that the distal end of the piston pulls away from being at rest in the closed position, the open valve position being reached upon the piston reaching at least 75% of a total distance the piston is capable of traveling in a proximal direction;
wherein the piston is configured to allow some of the pressurized gas to leak past the piston into the control chamber.

11. The method of claim 10, further comprising:
providing a valve control mechanism configured as part of the control valve; and
pneumatically connecting the control chamber to the control valve inlet with a conduit.

12. The method of claim 11, further comprising:
actuating the valve control mechanism resulting in the piston moving in a proximal direction to an open position causing the gas valve to release the pressurized gas from the source of pressurized gas through one or more holes in the cylinder.

13. The method of claim 12, wherein the control chamber becomes pneumatically connected to the atmosphere via the conduit in response to the valve control mechanism being actuated by a human user.

14. The method of claim 10, wherein the distal end of the piston is configured to contact a sealing gasket to form an airtight seal in response to the piston being moved to the closed position.

15. The method of claim 14, wherein the sealing gasket is an O-ring, the method further comprising:
positioning the O-ring around the distal end of the piston; and
moving the O-ring back and forth with the piston in said cylinder.

16. The method of claim 12, further comprising:
positioning a compression spring within the cylinder between the endcap and the proximal end of the piston; and
providing a cushion within the cylinder between the endcap and the proximal end of the piston.

17. The method of claim 12, wherein the O-ring is a first O-ring and a cushion positioned within the cylinder is a second O-ring.

* * * * *